US012688816B2

(12) United States Patent
Seo et al.

(10) Patent No.: US 12,688,816 B2
(45) Date of Patent: Jul. 21, 2026

(54) PIXEL AND DISPLAY DEVICE INCLUDING THE SAME

(71) Applicant: Samsung Display Co., Ltd., Yongin-si (KR)

(72) Inventors: Youngwan Seo, Yongin-si (KR); Junhyun Park, Yongin-si (KR); Soil Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 167 days.

(21) Appl. No.: 18/613,140

(22) Filed: Mar. 22, 2024

(65) Prior Publication Data

US 2025/0061840 A1 Feb. 20, 2025

(30) Foreign Application Priority Data

Aug. 17, 2023 (KR) ........................ 10-2023-0107789

(51) Int. Cl.
*G09G 3/32* (2016.01)

(52) U.S. Cl.
CPC ......... *G09G 3/32* (2013.01); *G09G 2300/043* (2013.01); *G09G 2310/0275* (2013.01)

(58) Field of Classification Search
CPC ............... G06G 3/32; G09G 2300/043; G09G 2310/0275
USPC ............................................................ 345/55
See application file for complete search history.

(56) References Cited

U.S. PATENT DOCUMENTS

2018/0197462 A1* 7/2018 Nagayama ............. G09G 3/325
2019/0251904 A1* 8/2019 Kim ..................... G09G 3/3283
2021/0057506 A1* 2/2021 Jo ...................... H10K 59/1216

FOREIGN PATENT DOCUMENTS

KR 1020210022216 A 3/2021
KR 102278601 B1 7/2021
KR 1020210081568 A 7/2021
KR 1020220093905 A 7/2022
KR 102469869 B1 11/2022

* cited by examiner

*Primary Examiner* — Mark Edwards
(74) *Attorney, Agent, or Firm* — CANTOR COLBURN LLP

(57) ABSTRACT

A pixel includes a first transistor including a gate terminal connected to a first node, a first terminal, and a second terminal connected to a second node, a second transistor including a gate terminal which receives a first gate signal, a first terminal which receives a data voltage, and a second terminal connected to the first node, a third transistor including a gate terminal which receives a second gate signal, a first terminal which receives a first power voltage, and a second terminal connected to the second terminal of the first transistor, a first capacitor including first and second terminals connected to the first and second nodes, respectively, a second capacitor including a first terminal which receives the first power voltage, and a second terminal connected to the second node, and a light emitting element connected to the second node and which receives a second power voltage.

18 Claims, 19 Drawing Sheets

PIXEL AND DISPLAY DEVICE INCLUDING THE SAME

This application claims priority to Korean Patent Application No. 10-2023-0107789, filed on Aug. 17, 2023, and all the benefits accruing therefrom under 35 U.S.C. § 119, the content of which in its entirety is herein incorporated by reference.

BACKGROUND

1. Field

Embodiments provide generally to a pixel. More particularly, embodiments relate to a pixel and a display device including the pixel.

2. Description of the Related Art

As information technology develops, the importance of display devices, which are communication media between users and information, is being highlighted. Accordingly, display devices such as a liquid crystal display device, an organic light emitting display device, a plasma display device, and the like are widely used in various fields.

The display device may include a display portion capable of displaying an image including a plurality of pixels. Each pixel may include a light emitting element, at least one transistor, and at least one capacitor. In addition, signal lines which apply signals and/or voltages to the pixels may be disposed in the display portion.

Meanwhile, the higher the resolution of the display device, the clearer and more vivid the image may be provided. In order to increase resolution of the display device, more pixels may be provided in a limited area.

SUMMARY

Embodiments provide a pixel which can be applied to a high-resolution display device.

Embodiments provide a display device including the pixel.

In an embodiment of the disclosure, a pixel, which sequentially performs an initialization operation, a threshold voltage compensation operation, a data writing operation, and a light emitting operation during one frame, includes a first transistor including a gate terminal connected to a first node, a first terminal, and a second terminal connected to a second node, a second transistor including a gate terminal, to which a first gate signal is applied, a first terminal, to which a data voltage is applied, and a second terminal connected to the first node, a third transistor including a gate terminal, to which a second gate signal is applied, a first terminal to which a first power voltage is applied, and a second terminal connected to the first terminal of the first transistor, a first capacitor including a first terminal connected to the first node and a second terminal connected to the second node, a second capacitor including a first terminal, to which the first power voltage is applied, and a second terminal connected to the second node, and a light emitting element including a first terminal connected to the second node and a second terminal, to which a second power voltage is applied.

In an embodiment, the first power voltage may have a low level during an initialization period, in which the initialization operation is performed. In such an embodiment, the first power voltage may have a high level after the initialization period. In an embodiment, the second power voltage may have a low level in a light emitting period, in which the light emitting operation is performed. In such an embodiment, the second power voltage may have a high level in remaining periods, in which the initialization operation, the threshold voltage compensation operation, and the data writing operation are performed in the one frame, excluding the light emitting period.

In an embodiment, each of the first, second, and third transistors may be an n-channel metal-oxide semiconductor (NMOS) transistor.

In an embodiment, the first gate signal may be a global clock signal for simultaneous light emitting.

In an embodiment, the second gate signal may have a high level in an initialization period, in which the initialization operation is performed, and a light emitting period, in which the light emitting operation is performed. In such an embodiment, the second gate signal may have a low level in a threshold voltage compensation period, in which the threshold voltage compensation operation is performed, and a data writing period, in which the data writing operation is performed.

In an embodiment of the disclosure, a display device according to embodiments of the disclosure includes a display portion including a plurality of pixels, where in each of the pixels sequentially performs an initialization operation, a threshold voltage compensation operation, a data writing operation, and a light emitting operation during one frame, and a driving circuit which drives the display portion by providing a data voltage, a first gate signal, a second gate signal, a first power voltage, and a second power voltage to the pixels. In such an embodiment, each of the pixels include a first transistor including a gate terminal connected to a first node, a first terminal, and a second terminal connected to a second node, a second transistor including a gate terminal to which a first gate signal is applied, a first terminal, to which a data voltage is applied, and a second terminal connected to the first node, a third transistor including a gate terminal, to which a second gate signal is applied, a first terminal, to which a first power voltage is applied, and a second terminal connected to the first terminal of the first transistor, a first capacitor including a first terminal connected to the first node and a second terminal connected to the second node, a second capacitor including a first terminal, to which the first power voltage is applied, and a second terminal connected to the second node, and a light emitting element including a first terminal connected to the second node and a second terminal, to which a second power voltage is applied.

In an embodiment, the first power voltage may have a low level during an initialization period, in which the initialization operation is performed. In such an embodiment, the first power voltage may have a high level after the initialization period.

In an embodiment, the second power voltage may have a low level in a light emitting period, in which the light emitting operation is performed. In such an embodiment, the second power voltage may have a high level in remaining periods, in which the initialization operation, the threshold voltage compensation operation, and the data writing operation are performed in the one frame, excluding the light emitting period.

In an embodiment, the pixels may simultaneously emit light during a light emitting period in which the light emitting operation is performed.

In an embodiment, the second gate signal may have a high level in an initialization period, in which the initialization operation is performed, and a light emitting period, in which the light emitting operation is performed. In such an embodiment, the second gate signal may have a low level in a threshold voltage compensation period, in which the threshold voltage compensation operation is performed, and a data writing period, in which the data writing operation is performed.

In an embodiment of the disclosure, a display device according to embodiments of the disclosure includes a display portion which displays an image and a driving circuit which drives the display portion by providing a driving signal to the display portion. In such an embodiment, the display portion includes an active layer disposed on a substrate, a first gate layer disposed on the active layer and including a first gate electrode, a second gate layer disposed on the first gate layer and including a capacitor electrode, where the capacitor electrode overlaps the first gate electrode in a plan view and constitutes a first capacitor together with a part of the first gate electrode overlapping the capacitor electrode, a first upper conductive layer disposed on the second gate layer and including an additional power line to which a first power voltage is applied, a second upper conductive layer disposed on the first upper conductive layer and including a power line to which a second power voltage is applied and a connection pattern connected to the capacitor electrode through a contact hole, where the connection pattern partially overlaps the additional power line in the plan view and constitutes a second capacitor together with a part of the additional power line overlapping the connection pattern, and a pixel electrode disposed on the second upper conductive layer and connected to the connection pattern through a contact hole.

In an embodiment, the substrate may include a display area corresponding to the display portion, and a peripheral area located around the display area, where the driving circuit is disposed in the peripheral area, and the additional power line may be connected to a portion of the power line in the peripheral area through a contact hole.

In an embodiment, the first power voltage and the second power voltage may be a same voltage.

In an embodiment, the first power voltage may be different form the second power voltage, and the first power voltage may be a direct current power voltage.

In an embodiment, the substrate may include a display area corresponding to the display portion, and a peripheral area located around the display area, where the driving circuit is disposed in the peripheral area, and the additional power line may be connected to a portion of the power line in the display area through a contact hole.

In an embodiment, the power line may at least partially overlap the additional power line in the plan view.

In an embodiment, the active layer may include a first active pattern and a second active pattern spaced apart from each other. In such an embodiment, the first gate layer may further include a second gate electrode overlapping the second active pattern in the plan view and a third gate electrode overlapping the first active pattern in the plan view. In such an embodiment, the first active pattern may constitute a first transistor together with a part of the first gate electrode overlapping the first active pattern. In such an embodiment, the second active pattern may constitute a second transistor together with a part of the second gate electrode overlapping the second active pattern. In such an embodiment, the first active pattern may constitute a third transistor together with a part of the third gate electrode overlapping the first active pattern.

In an embodiment, the second upper conductive layer may further include a date line at least partially overlapping the connection pattern in the plan view, where a data voltage is applied to the data line.

In an embodiment, each of the power line, the additional power line, and the data line may extend in a first direction, and the power line, the additional power line, and the data line may be spaced apart from each other in a second direction crossing the first direction in the plan view.

In a pixel and a display device according to embodiments of the disclosure, the pixel may include a pixel circuit including three transistors and two capacitors, and a light emitting element electrically connected to the pixel circuit. In such embodiments, a first capacitor among the capacitors may be connected between a gate terminal of a first transistor and a first terminal of the first transistor, and a second capacitor among the capacitors may be connected between the first terminal of the first transistor and a first power voltage. In such embodiments, a plurality of pixels may emit light simultaneously during a light emitting period.

In such embodiments, the first power voltage may have a low level in an initialization period and may have a high level after the initialization period, and the second power voltage may have a low level in the light emitting period and may have a high level in remaining periods excluding the light emitting period.

In such embodiments, a part of a connection pattern connected to a pixel electrode and a part of an additional power line overlapping the part of the connection pattern may constitute the second capacitor. In such embodiments, the first power voltage or a direct current power voltage may be applied to the additional power line.

Accordingly, in such embodiments, the data swing range can be relatively reduced, such that the pixels can be applied to small and medium-sized high-resolution display devices.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
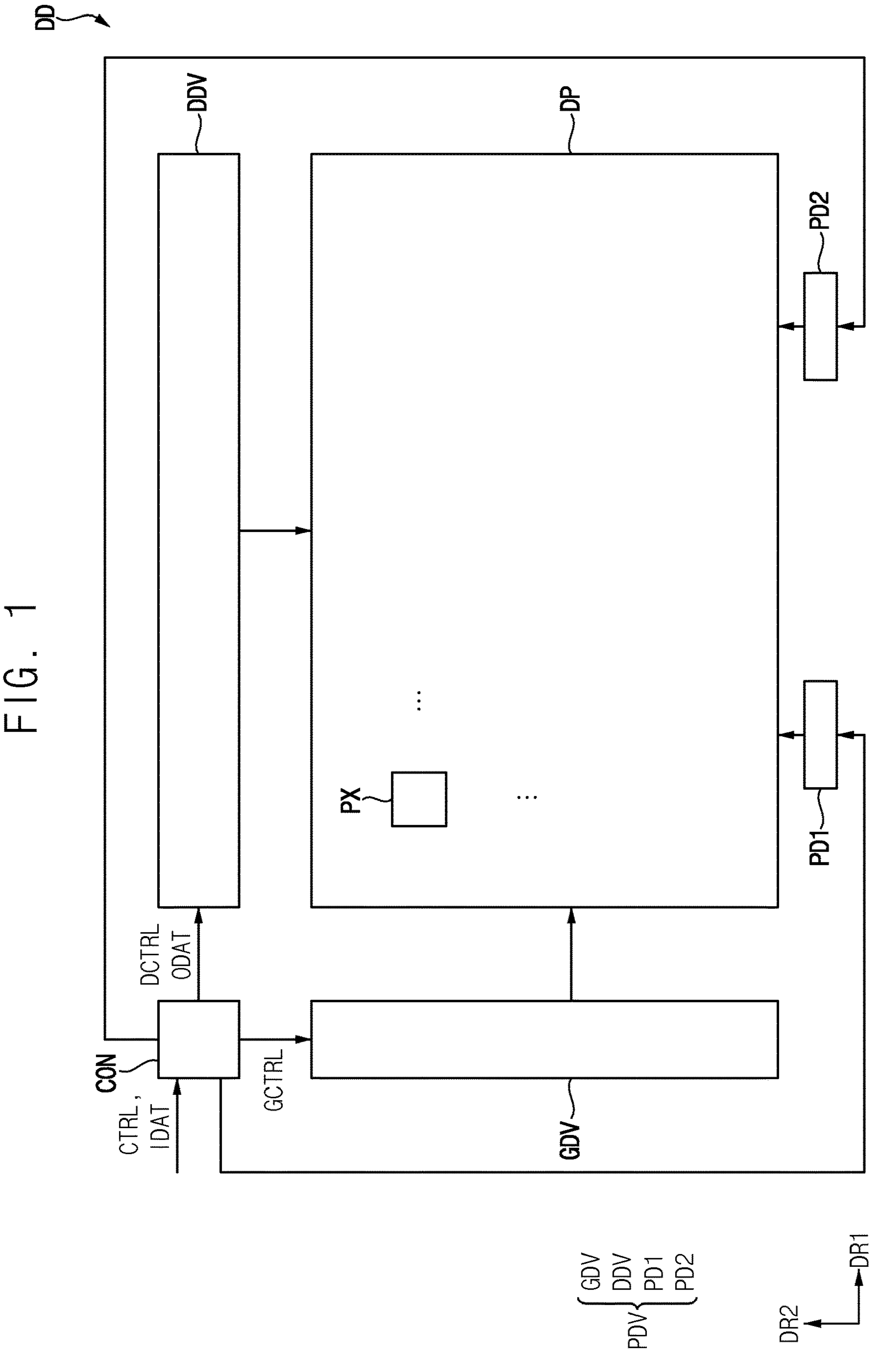
FIG. 1 is a plan view illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a pixel and a display device including the pixel according to embodiments of the disclosure will be described in detail with reference to the accompanying drawings. The same reference numerals are used for the same components in the drawings, and any repetitive detailed descriptions of the same components will be omitted.

FIG. 1 is a plan view illustrating a display device according to an embodiment of the disclosure.

Referring to FIG. 1, a display device DD according to an embodiment of the disclosure may include a display portion DP and a driving circuit PDV.

The display device DD may display an image through the display portion DP. For example, the display portion DP may include a plurality of pixels PX. Each of the plurality of pixels PX may include a transistor and a light emitting element electrically connected to the transistor. The light emitting element may emit light by receiving a driving signal from the transistor. In this way, the display device DD may display an image by the plurality of pixels PX which emits light.

Each pixel PX may display a predetermined basic color. In other words, one pixel PX may be a minimum unit capable of displaying a color independent of other pixels PX. For example, each pixel PX may display a corresponding one color among red, green, and blue.

The pixels PX may be arranged in a matrix form along a first direction DR1 and a second direction DR2 crossing the first direction DR1. For example, the first direction DR1 and the second direction DR2 may be perpendicular.

Figure 2:
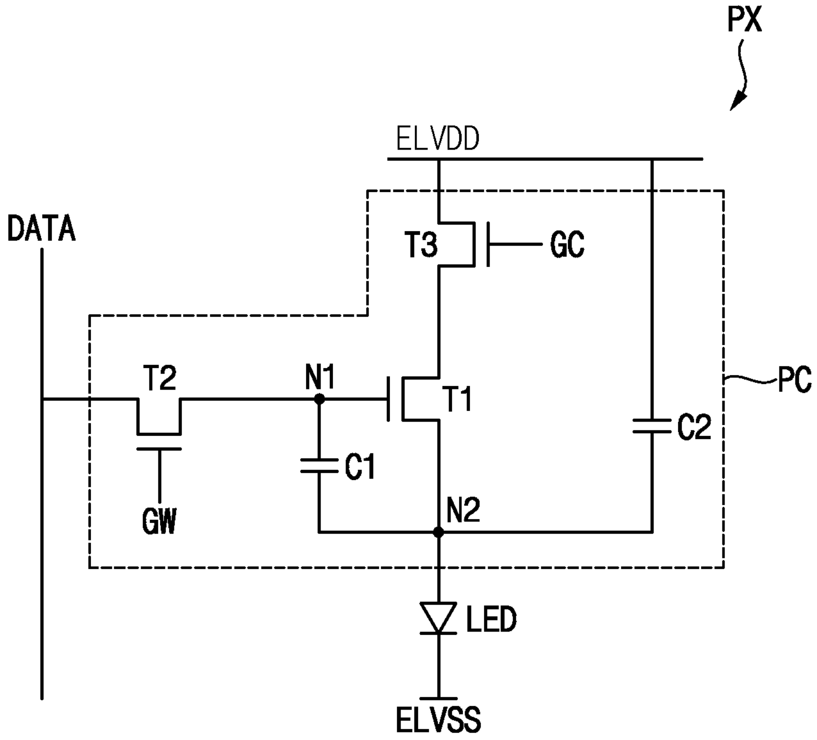
FIG. 2 is a circuit view illustrating one pixel included in a display portion of FIG. 1.

The driving circuit PDV may provide various driving signals (e.g., a data voltage DATA, a first gate signal GW, a second gate signal GC, a first power voltage ELVDD, and a second power voltage ELVSS of FIG. 2) to the plurality of pixels PX. Accordingly, the driving circuit PDV may drive the display portion DP. The driving circuit PDV may include a gate driver GDV, a data driver DDV, a timing controller CON, a first power driver PD1, and a second power driver PD2.

The timing controller CON may generate a gate control signal GCTRL, a data control signal DCTRL, and output image data ODAT based on a control signal CTRL and an input image data IDAT provided from an outside. For example, the control signal CTRL may include a vertical synchronization signal, a horizontal synchronization signal, an input data enable signal, a master clock signal, or the like. For example, the input image data IDAT may be RGB data including red image data, green image data, and blue image data. Alternatively, the input image data IDAT may include magenta image data, cyan image data, and yellow image data.

The gate driver GDV may generate gate signals based on the gate control signal GCTRL provided from the timing controller CON. For example, the gate control signal GCTRL may include a vertical start signal, a clock signal, or the like. For example, the gate driver GDV may be manufactured as a separate panel and connected to the display portion DP. The gate driver GDV may be electrically connected to the display portion DP and may sequentially output the gate signals. Each of the plurality of pixels PX may receive data voltages from the data driver DDV based on the control of each of the gate signals.

The data driver DDV may generate the data voltages based on the data control signal DCTRL and the output image data ODAT provided from the timing controller CON. For example, the data control signal DCTRL may include an output data enable signal, a horizontal start signal, a load signal, or the like. For example, the data driver DDV may be manufactured as a separate panel and electrically connected to the display portion DP. Each of the plurality of pixels PX may provide a signal for luminance corresponding to each of the data voltages to the light emitting element.

The first power driver PD1 may be controlled by the timing controller CON. The first power driver PD1 may provide a first power voltage (e.g., the first power voltage ELVDD of FIG. 2) to the plurality of pixels PX. In an embodiment, the first power driver PD1 may change a voltage level of the first power voltage at a predetermined time during each frame period.

The second power driver PD2 may be controlled by the timing controller CON. The second power driver PD2 may provide a second power voltage (e.g., the second power voltage ELVSS of FIG. 2) to the plurality of pixels PX. In an embodiment, the second power driver PD2 may change a voltage level of the second power voltage at a predetermined time during each frame period.

In an embodiment, the driving circuit PDV may drive the display portion DP in a simultaneous light emitting driving method including a simultaneous light emitting period in which all pixels PX emit light simultaneously in one frame. That is, the display device DD may be driven in the simultaneous light emitting driving method.

FIG. 2 is a circuit view illustrating one pixel included in a display portion of FIG. 1.

Referring to FIG. 2, each pixel PX may include a pixel circuit PC and a light emitting element LED electrically connected to the pixel circuit PC. The pixel circuit PC may provide a driving current to the light emitting element LED, and the light emitting element LED may emit light based on the driving current. In an embodiment, for example, the pixel circuit PC may include first, second, and third transistors T1, T2, and T3, a first capacitor C1, and a second capacitor C2, as shown in FIG. 2.

The first transistor T1 may include a gate terminal, a first terminal, and a second terminal. The gate terminal of the first transistor T1 may be connected to a first node N1. The first terminal of the first transistor T1 may be connected to a second node N2. The second terminal of the first transistor T1 may be connected to a second terminal of the third transistor T3. The first transistor T1 may receive the first power voltage ELVDD corresponding to the voltage of the first node N1 and supply the driving current to the light emitting element LED. For example, the first transistor T1 may be a driving transistor for driving the light emitting element LED.

The second transistor T2 may include a gate terminal, a first terminal, and a second terminal. The first gate signal GW may be applied to the gate terminal of the second transistor T2. The data voltage DATA may be applied to the first terminal of the second transistor T2. The second terminal of the second transistor T2 may be connected to the first node N1. The second transistor T2 may be turned on by the first gate signal GW to electrically connect a data line that provides the data voltage DATA to the first node N1.

In an embodiment, the first gate signal GW may be a global clock signal for simultaneous light emitting. In an embodiment, for example, where the display device DD including the plurality of pixels PX operates in the simultaneous light emitting driving method, the first gate signal GW may be commonly applied to the plurality of pixels PX. In this case, the first gate signal GW and the second gate signal GC may be generated by separate gate drivers, respectively.

The third transistor T3 may include a gate terminal, a first terminal, and a second terminal. The second gate signal GC may be applied to the gate terminal of the third transistor T3. The first power voltage ELVDD may be applied to the first terminal of the third transistor T3. The second terminal of the third transistor T3 may be connected to the second terminal of the first transistor T1. The third transistor T3 may be turned on by the second gate signal GC to electrically connect a power line that provides the second power voltage ELVDD to the second terminal of the first transistor T1.

The first capacitor C1 may include a first terminal and a second terminal. The first terminal of the first capacitor C1 may be connected to the first node N1. The second terminal of the first capacitor C1 may be connected to the second node N2. The first capacitor C1 may store a difference voltage between the gate voltage and the source voltage of the first transistor T1.

The second capacitor C2 may include a first terminal and a second terminal. In an embodiment, the first power voltage ELVDD may be applied to the first terminal of the second capacitor C2, and the second terminal of the second capacitor C2 may be connected to the second node N2. The second capacitor C2 may maintain a voltage between the first power voltage ELVDD and the second node N2.

In another embodiment, a direct current power voltage (e.g., a gate high voltage or a gate low voltage) different from the first power voltage ELVDD may be applied to the first terminal of the second capacitor C2, and the second terminal of the second capacitor C2 may be connected to the second node N2.

In an embodiment, each of the first, second, and third transistors T1, T2, and T3 may be an n-channel metal-oxide semiconductor (NMOS) transistor. However, embodiments of the disclosure are not limited thereto. In an embodiment, for example, each of the first, second, and third transistors T1, T2, and T3 may be a p-channel metal-oxide semiconductor (PMOS) transistor.

The light emitting element LED may include a first terminal (e.g., an anode terminal) and a second terminal (e.g., a cathode terminal). The first terminal of the light emitting element LED may be connected to the second node N2. The second power voltage ELVSS may be applied to the second terminal of the light emitting element LED.

In FIG. 2, an embodiment where the pixel circuit PC includes three transistors and two capacitors is shown, but embodiments of the disclosure are not limited thereto.

In FIG. 2, an embodiment where the pixel PX includes a single light emitting element LED is shown, but embodiments of the disclosure are not limited thereto. In an embodiment, for example, one pixel PX may include two or more light emitting elements.

Figure 3:
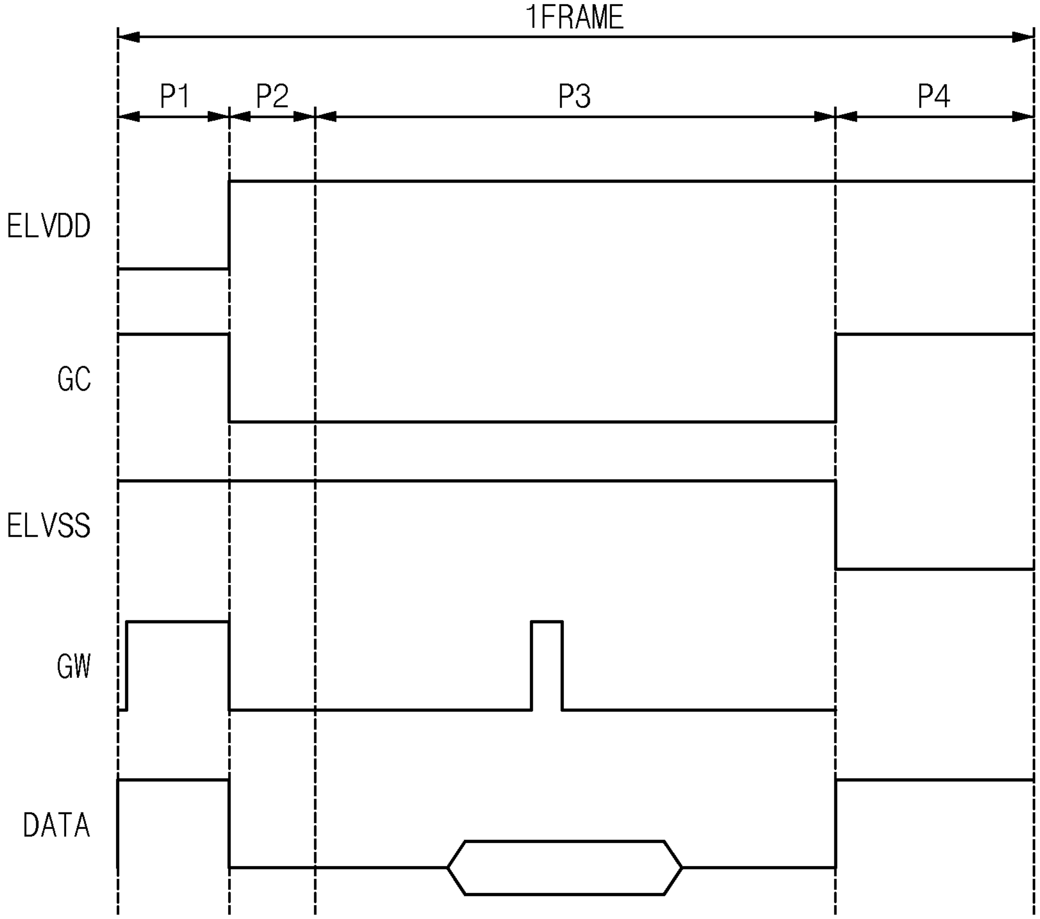
FIG. 3 is a waveform view illustrating an operation period of the pixel of FIG. 2.

FIG. 3 is a waveform view illustrating an operation period of the pixel of FIG. 2.

Referring to FIGS. 2 and 3, an operation period of the pixel PX may include an initialization period P1 in which an initialization operation is performed, a threshold voltage compensation period P2 in which a threshold voltage compensation operation is performed, a data writing period P3 in which a data writing operation is performed, and a light emitting section P4 in which a light emitting operation is performed.

The pixel PX may sequentially perform the initialization operation, the threshold voltage compensation operation, the data writing operation, and the light emitting operation during one frame 1FRAME. As the pixel PX sequentially performs the initialization operation, the threshold voltage compensation operation, the data writing operation, and the light emitting operation during one frame 1FRAME, the operation period of the pixel PX may also sequentially include the initialization period P1, the threshold voltage compensation period P2, the data writing period P3, and the light emitting period P4.

In the initialization period P1, the first power voltage ELVDD may have a low level, the second power voltage ELVSS may have a high level, and each of the first and second gate signals GW and GC may have a high level, and the data voltage DATA may have a high level. Accordingly, during the initialization period P1, the first terminal (e.g., the anode terminal) of the light emitting element LED may be initialized in all of the pixels PX. That is, the initialization period P1 may be performed simultaneously in all pixels PX.

In the threshold voltage compensation period P2, the first power voltage ELVDD may have a high level, the second power voltage ELVSS may have a high level, and each of the first and second gate signals GW and GC may have a low level, and the data voltage DATA may have a low level. Accordingly, the threshold voltage of the first transistor T1 may be compensated during the threshold voltage compensation period P2. That is, the threshold voltage compensation period P2 may be performed simultaneously in all pixels PX.

In the data writing period P3, the first power supply voltage ELVDD may have a high level, the second power supply voltage ELVSS may have a high level, the first gate signal GW may transit from the low level to the high level and may transit from the high level to the low level after the data writing operation time has elapses, the second gate signal GC may have a low level, and the data voltage DATA may have a level corresponding to a predetermined gray level. Accordingly, during the data writing period P3, the data voltage DATA may be sequentially written to the pixel PX in units of pixel rows.

In the light emitting period P4, the first power supply voltage ELVDD may have a high level, the second power voltage ELVSS may have a low level, the first gate signal GW may have a low level, the second gate signal GC may have a high level, and the data voltage DATA may have a high level. Accordingly, during the light emitting period P4, all pixels PX may emit light simultaneously.

That is, the display device DD may sequentially write the data voltage DATA in units of pixel rows in one frame 1FRAME and may emit light simultaneously from all pixels PX.

As a result, in an embodiment, the first power voltage ELVDD may have a low level in the initialization period P1 and may have a high level after the initialization period P1. The second power voltage ELVSS may have a low level in the light emitting period P4 and may have a high level in the remaining periods (i.e., the initialization period, the threshold voltage compensation period, and the data writing period) excluding the light emitting section P4. The first gate signal GW may have a high level in the initialization period P1, may have a low level in the threshold voltage compensation period P2 and the light emitting period P4, and may transit from a low level to a high level and may transit from a high level to a low level after a predetermined time has elapsed in the data writing period P3. The second gate signal GC may have a high level in the initialization period P1 and the light emitting period P4, and may have a low level in the threshold voltage compensation period P2 and the data writing period P3.

In an embodiment, as described above, the first power supply voltage ELVDD has a low level in the initialization period P1 and has a high level after the initialization period P1, and the second power voltage ELVSS has a low level in the light emission period P4 and has a high level in the remaining periods excluding the light emitting period P4, such that the data swing range may decrease.

However, the embodiments of the disclosure are not limited to this, and the waveforms of the first power voltage ELVDD, the second power voltage ELVSS, the first gate signal GW, and the second gate signal GC, and the data voltage DATA shown in FIG. 3 are merely examples. In embodiments of the disclosure, the waveforms of the first power voltage ELVDD, the second power voltage ELVSS, the first gate signal GW, the second gate signal GC, and the data voltage DATA may be changed in various ways.

Figure 4:
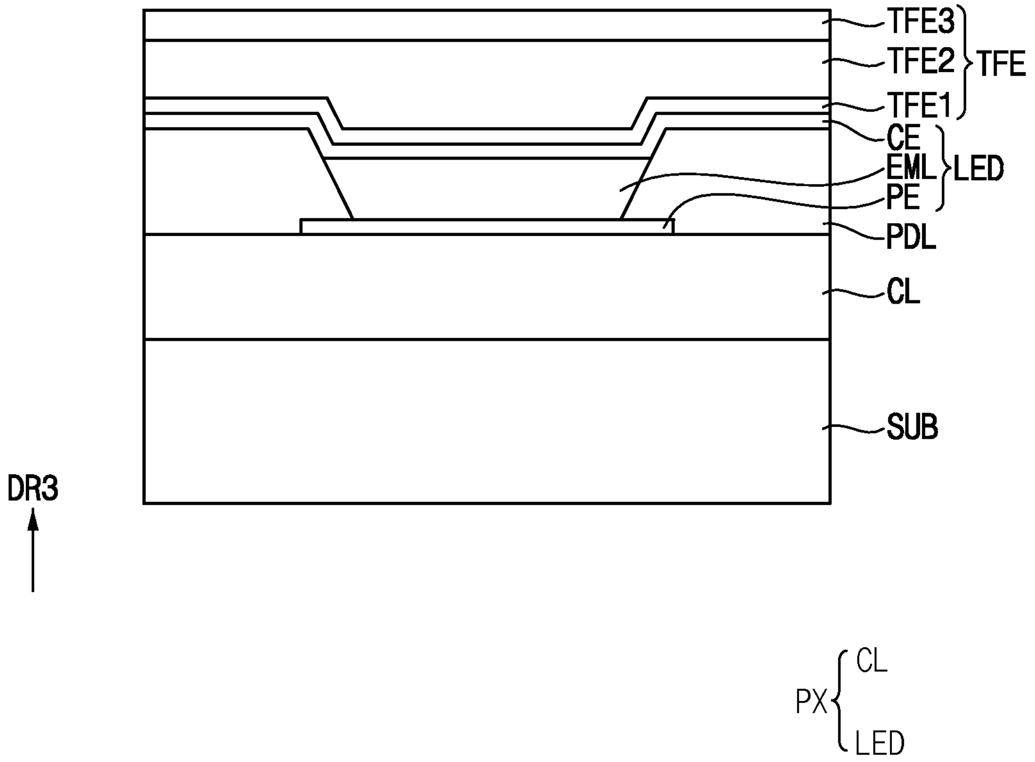
FIG. 4 is a cross-sectional view schematically illustrating the display portion of FIG. 1.

FIG. 4 is a cross-sectional view schematically illustrating the display portion of FIG. 1.

Referring to FIG. 4, in an embodiment, the display portion DP may include a substrate SUB, a circuit layer CL, the light emitting element LED, a pixel defining layer PDL, and an encapsulation layer TFE. Here, the circuit layer CL and the light emitting element LED may define the pixel PX. Here, a third direction DR3, which is perpendicular to the first direction DR1 and the second direction DR3, may be a thickness direction of the display panel DP or the substrate SUB.

The substrate SUB may include a transparent material or an opaque material. The substrate SUB may include or be made of a transparent resin substrate. Examples of the transparent resin substrate include a polyimide substrate. In this case, the polyimide substrate may include a first organic layer, a first barrier layer, a second organic layer, or the like. Alternatively, the substrate SUB may include a quartz substrate, synthetic quartz substrate, calcium fluoride substrate, F-doped quartz substrate, a soda-lime glass substrate, a non-alkali glass substrate, or the like. These can be used alone or in combination with each other.

The circuit layer CL may be disposed on the substrate SUB. The circuit layer CL may provide signals and voltages for the light emitting element LED to emit light to the light emitting element LED. For example, the circuit layer CL may include a transistor, a conductive layer, an insulating layer, or the like.

The pixel electrode PE may be disposed on the circuit layer CL. The pixel electrode PE may receive the signals and voltages from the circuit layer CL. For example, the pixel electrode PE may include metal, alloy, metal nitride, conductive metal oxide, transparent conductive material, or the like. These can be used alone or in combination with each other. For example, the pixel electrode PE may be an anode terminal. Alternatively, the pixel electrode PE may be a cathode terminal.

The pixel defining layer PDL may be disposed on the circuit layer CL and the pixel electrode PE. The pixel defining layer PDL may define an opening exposing a part of the pixel electrode PE. As the pixel defining layer PDL defines the opening, the pixel defining layer PDL may define a pixel (e.g., the pixel PX of FIG. 2) which emits light. The pixel defining layer PDL may include organic materials and/or inorganic materials. Examples of the organic material that can be used as a pixel defining layer PDL may include photoresist, polyacrylic resin, polyimide resin, polyamide resin, siloxane resin, acrylic resin, epoxy resin, or the like. These can be used alone or in combination with each other.

The light emitting layer EML may be disposed on the pixel electrode PE. In an embodiment, the light emitting layer EML may be disposed in the opening of the pixel defining layer PDL. The light emitting layer EML may include light emitting materials to emit light.

The common electrode CE may be disposed on the pixel defining layer PDL and the light emitting layer EML. For example, the common electrode CE may include metal, alloy, metal nitride, conductive metal oxide, transparent conductive material, or the like. These can be used alone or in combination with each other. For example, the common electrode CE may be a cathode terminal. Alternatively, the common electrode CE may be an anode terminal.

In an embodiment, as described above, the light emitting element LED including the pixel electrode PE, the light emitting layer EML, and the common electrode CE may be disposed on the substrate SUB.

The encapsulation layer TFE may be disposed on the common electrode CE. The encapsulation layer TFE may protect the light emitting element LED from external oxygen and moisture. The encapsulation layer TFE may include at least one inorganic layer and at least one organic layer. For example, the encapsulation layer TFE may include a first inorganic layer TFE1 disposed on the common electrode CE, an organic layer TFE2 disposed on the first inorganic layer TFE1, and a second inorganic layer TFE3 disposed on the organic layer TFE2.

Figure 16:
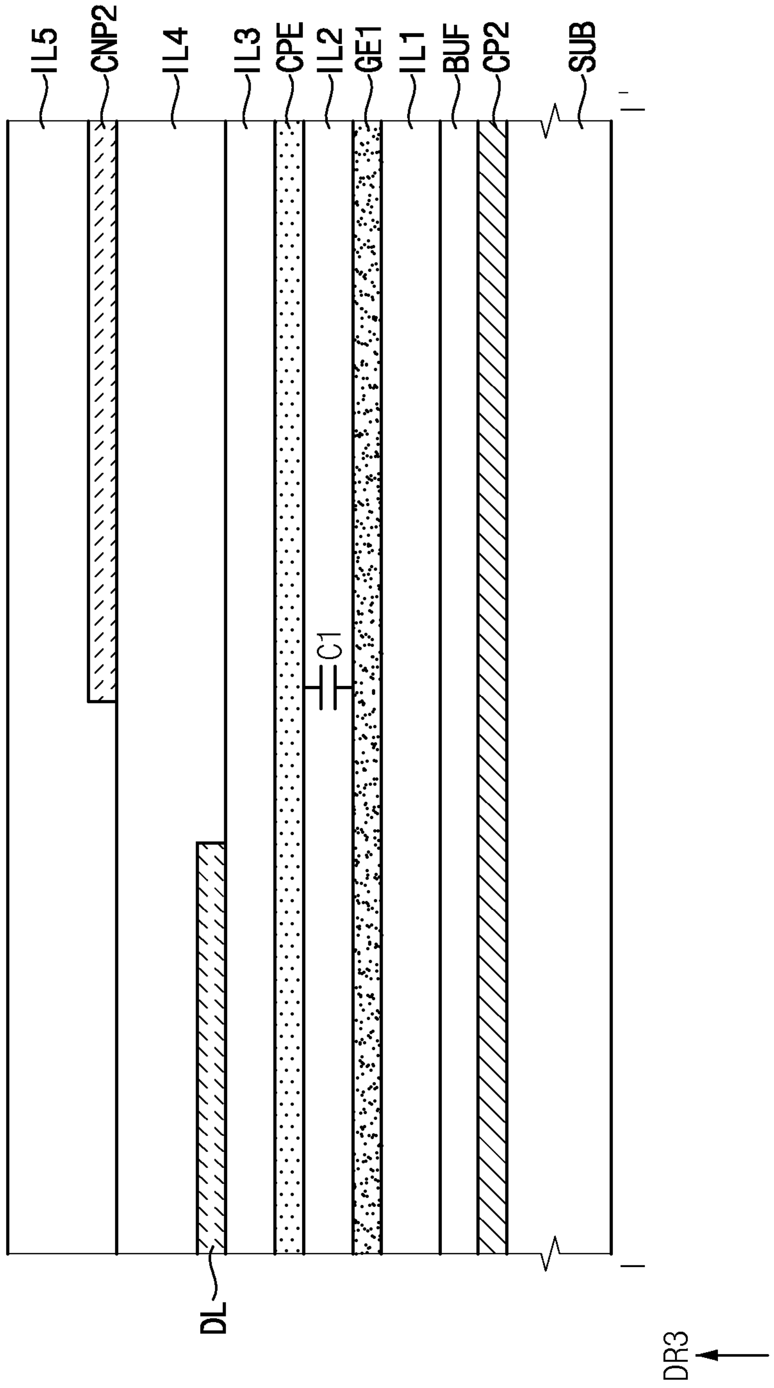
FIG. 16 is a cross-sectional view taken along line I-I' of FIG. 15.
Figure 17:
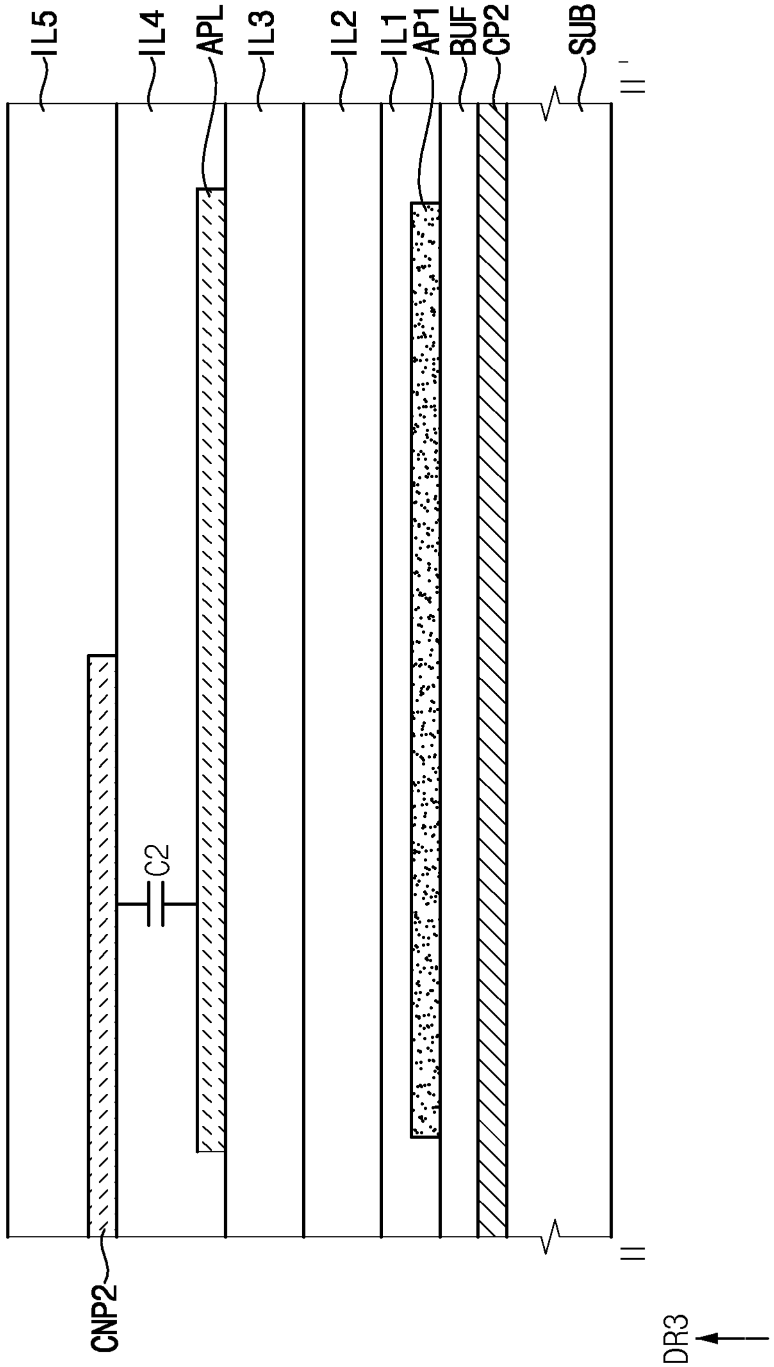
FIG. 17 is a cross-sectional view taken along line II-II' of FIG. 15.

FIGS. 5 to 15 are plan views illustrating layers of the display portion of FIGS. 1 and 2. FIG. 16 is a cross-sectional view taken along line I-I' of FIG. 15. FIG. 17 is a cross-sectional view taken along line II-II' of FIG. 15.

Figure 5:
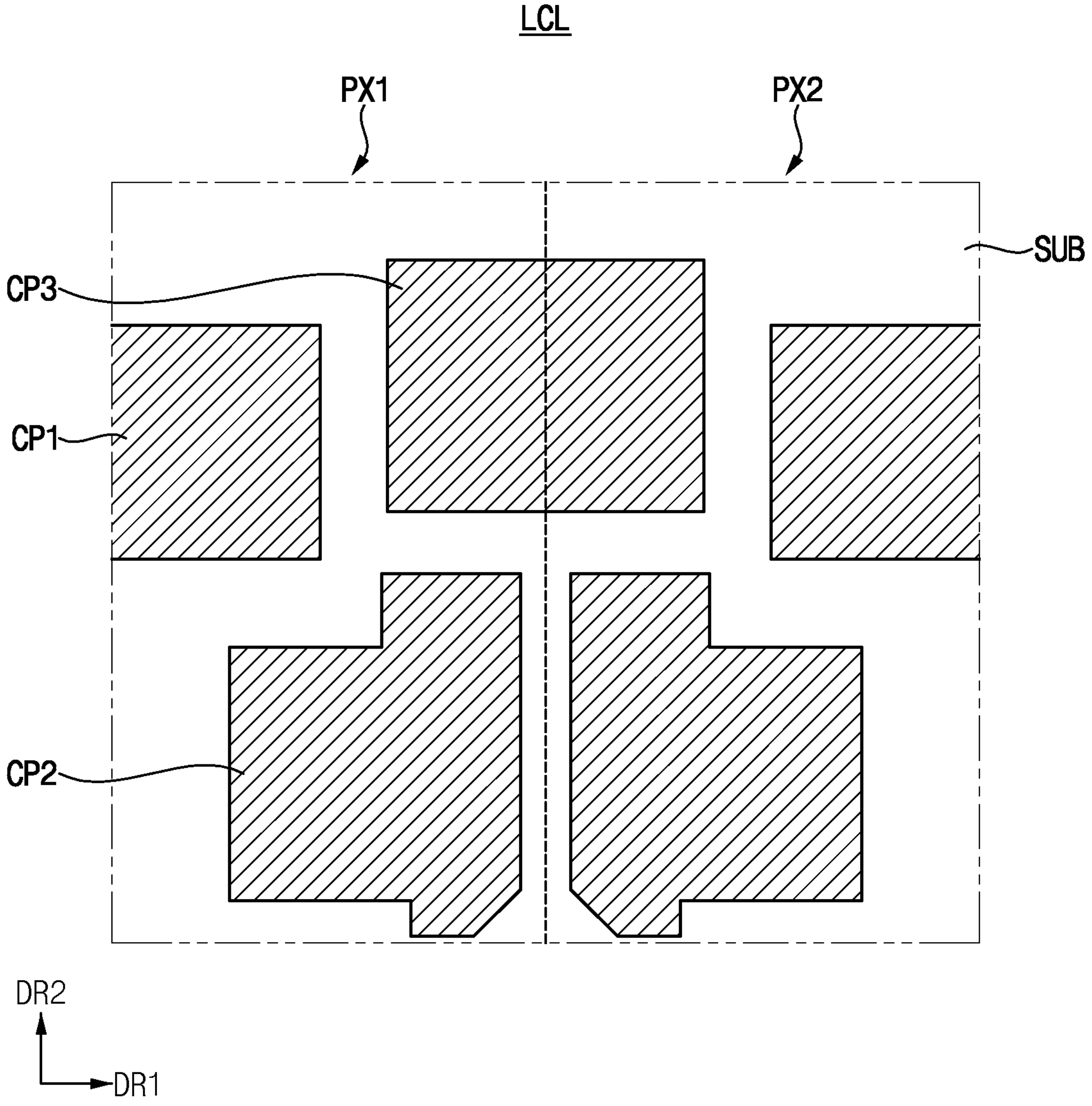
FIGS. 5 to 15 are plan views illustrating layers of the display portion of FIGS. 1 and 2.

Referring to FIG. 5, in an embodiment, the display portion DP may include a first pixel PX1 and a second pixel PX2 that are adjacent to each other. In an embodiment, the second pixel PX2 may have a structure that is symmetrical to the structure of the first pixel PX1 based on an imaginary symmetry line. Hereinafter, the components included in the display portion DP will be described.

The display portion DP may include a lower metal layer LCL disposed on the substrate SUB. The lower metal layer LCL may include a first conductive pattern CP1, a second conductive pattern CP2, and a third conductive pattern CP3. The first conductive pattern CP1, second conductive pattern CP2, and third conductive pattern CP3 may be disposed to be spaced apart from each other.

The first conductive pattern CP1, the second conductive pattern CP2, and the third conductive pattern CP3 may be disposed in a same layer as each other. In addition, the first conductive pattern CP1, the second conductive pattern CP2, and the third conductive pattern CP3 may include a same material as each other and be formed through a same process.

The first conductive pattern CP1 may be disposed in the first pixel PX1 and the second pixel PX2, respectively. The first conductive pattern CP1 disposed in the first pixel PX1 and the first conductive pattern CP1 disposed in the second pixel PX2 may be symmetrical to each other based on an imaginary symmetry line at a boundary between the first pixel PX1 and the second pixel PX2. For example, the first conductive pattern CP1 may be a back gate terminal of the second transistor T2 of FIG. 9.

In such an embodiment, the second conductive pattern CP2 may also be disposed in the first pixel PX1 and the second pixel PX2, respectively. The second conductive pattern CP2 disposed in the first pixel PX1 and the second conductive pattern CP2 disposed in the second pixel PX2 may be symmetrical to each other based on an imaginary symmetry line.

The third conductive pattern CP3 may be shared by a first area where the first pixel PX1 is disposed and a second area where the second pixel PX2 is disposed. That is, the third conductive pattern CP3 may include a first part disposed in the first area and a second part disposed in the second area. In other words, the first part of the third conductive pattern CP3 may be symmetrical with the second part based on an imaginary symmetry line vertically passing through a center of the third conductive pattern CP3. For example, the third conductive pattern CP3 may be a back gate terminal of the third transistor T3 of FIG. 9.

For example, the lower metal layer LCL may include metal, alloy, metal nitride, conductive metal oxide, transparent conductive material, or the like. These can be used alone or in combination with each other.

Figure 6:
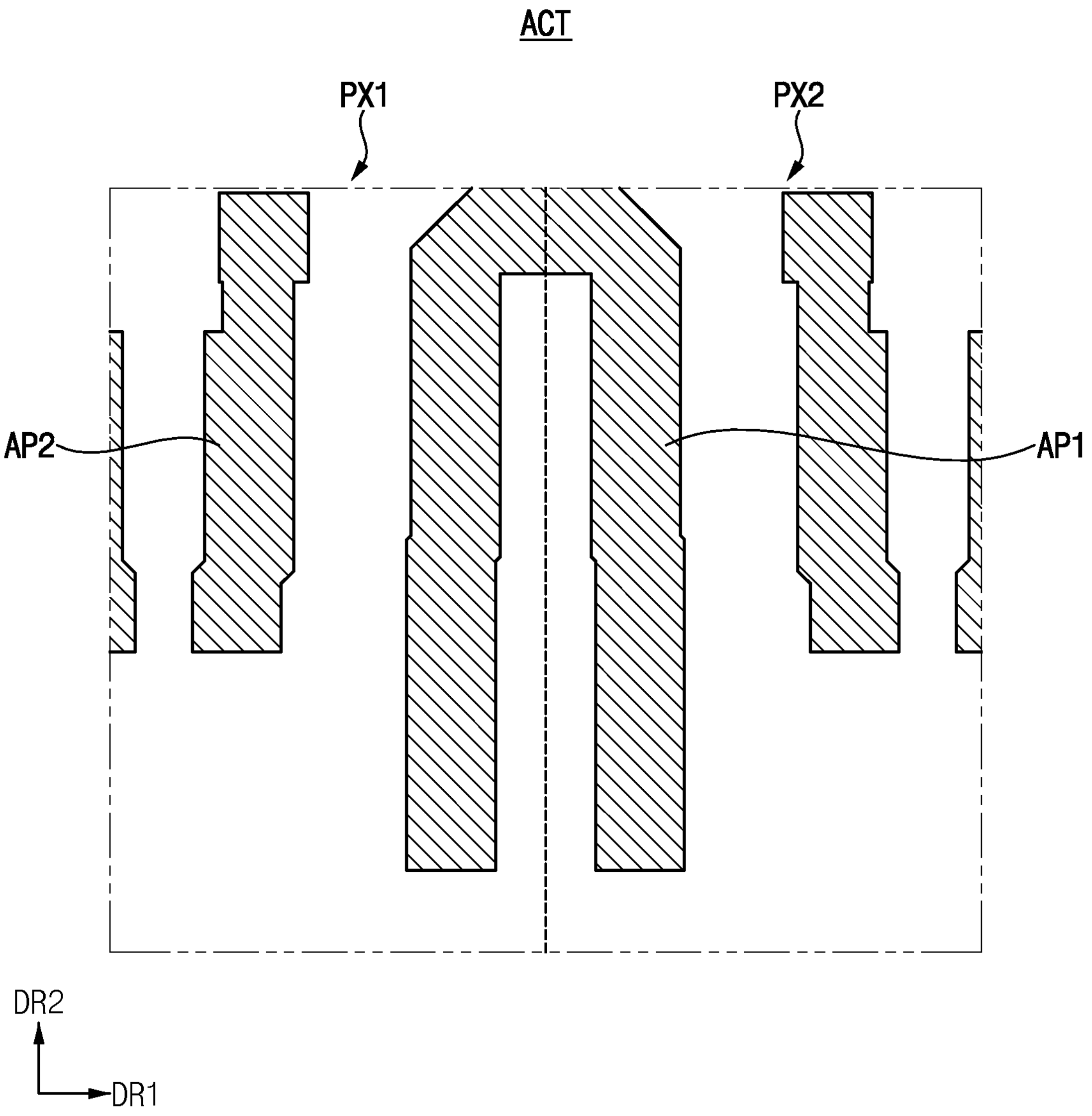
Figure 7:
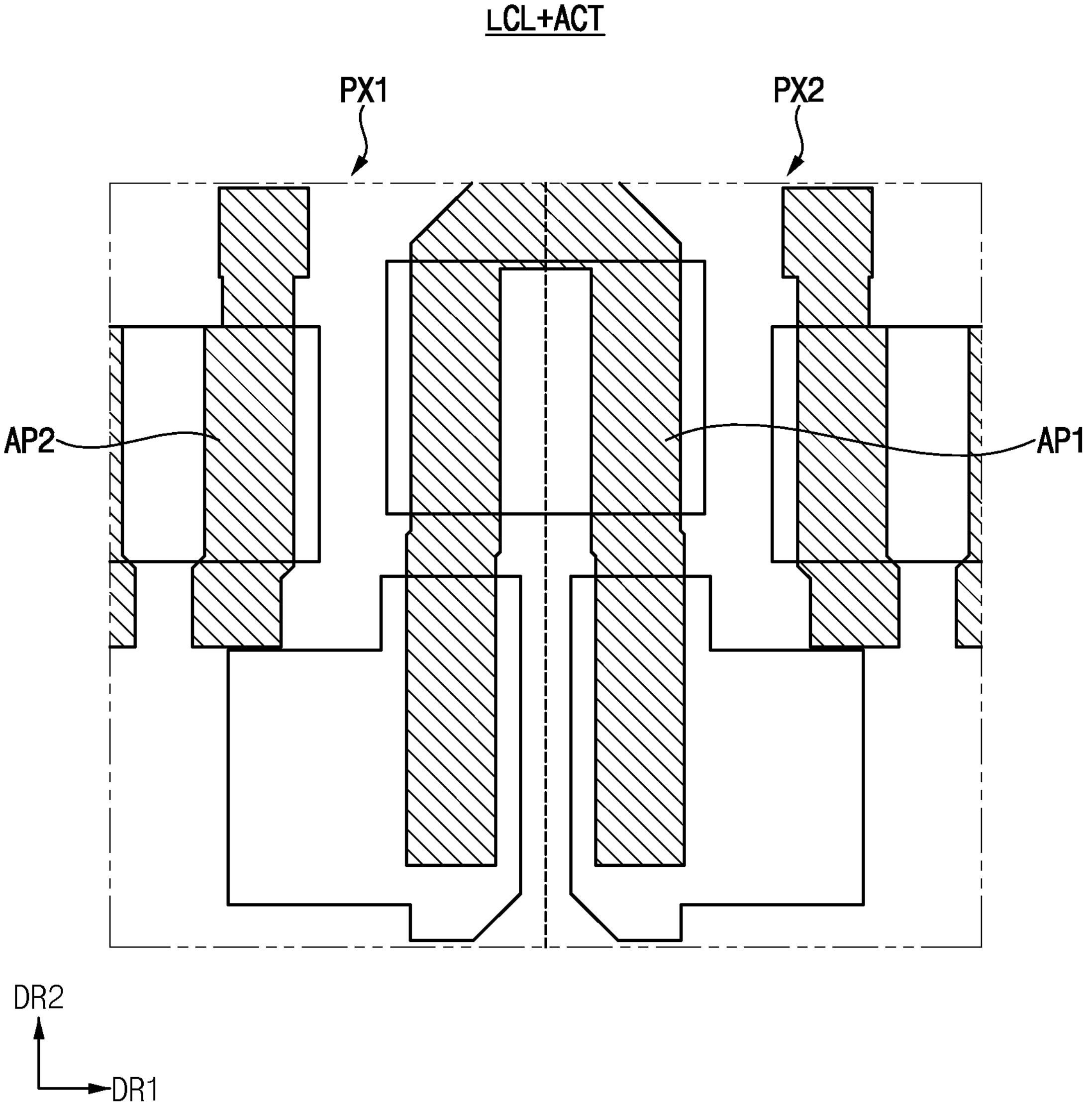

Referring further to FIGS. 6 and 7, the display portion DP may further include an active layer ACT disposed on the lower metal layer LCL. In an embodiment, a buffer layer BUF may be disposed on the lower metal layer LCL, and the active layer ACT may be disposed on the buffer layer BUF. For example, the buffer layer BUF may include a silicon compound such as silicon oxide, silicon nitride, or the like. These can be used alone or in combination with each other (see FIGS. 16 and 17).

The active layer ACT may include a first active pattern AP1 and a second active pattern AP2. The first active pattern AP1 and the second active pattern AP2 may be disposed to be spaced apart from each other.

The first active pattern AP1 and the second active pattern AP2 may be disposed in a same layer as each other. In addition, the first active pattern AP1 and the second active pattern AP2 may include a same material as each other and be formed through a same process.

The first active pattern AP1 may at least partially overlap the second conductive pattern CP2 and the third conductive pattern CP3 in a plan view (or when viewed in the third direction DR3). The first active pattern AP1 may be shared by a first area where the first pixel PX1 is disposed and a second area where the second pixel PX2 is disposed. That is, the first active pattern AP1 may include a first part disposed in the first area and a second part disposed in the second area. In other words, the first part of the first active pattern AP1 may be symmetrical with the second part based on an imaginary symmetry line vertically passing through a center of the first active pattern AP1.

The second active pattern AP2 may at least partially overlap the first conductive pattern CP1 in the plan view. The second active pattern AP2 may be disposed in the first pixel PX1 and the second pixel PX2, respectively. The second active pattern AP2 disposed in the first pixel PX1 and the second active pattern AP2 disposed in the second pixel PX2 may be symmetrical to each other based on an imaginary symmetry line.

In an embodiment, the active layer ACT may include a metal oxide semiconductor. The metal oxide semiconductor may include a two-component compound ($AB_x$), a three-component compound ($AB_xC_y$), a four-component compound ($AB_xC_yD_z$), or the like including indium (In), zinc (Zn), gallium (Ga), tin (Sn), titanium (Ti), aluminum (Al), hafnium (Hf), zirconium (Zr), magnesium (Mg), or the like. For example, the metal oxide semiconductor may include zinc oxide ($ZnO_x$), gallium oxide ($GaO_x$), tin oxide ($SnO_x$), indium oxide ($InO_x$), indium gallium oxide (IGO), indium zinc oxide (IZO), indium tin oxide. (ITO), indium zinc tin oxide (IZTO), indium gallium zinc oxide (IGZO), or the like. These can be used alone or in combination with each other.

In another embodiment, the active layer ACT may include a silicon semiconductor such as amorphous silicon or polycrystalline silicon.

Figure 8:
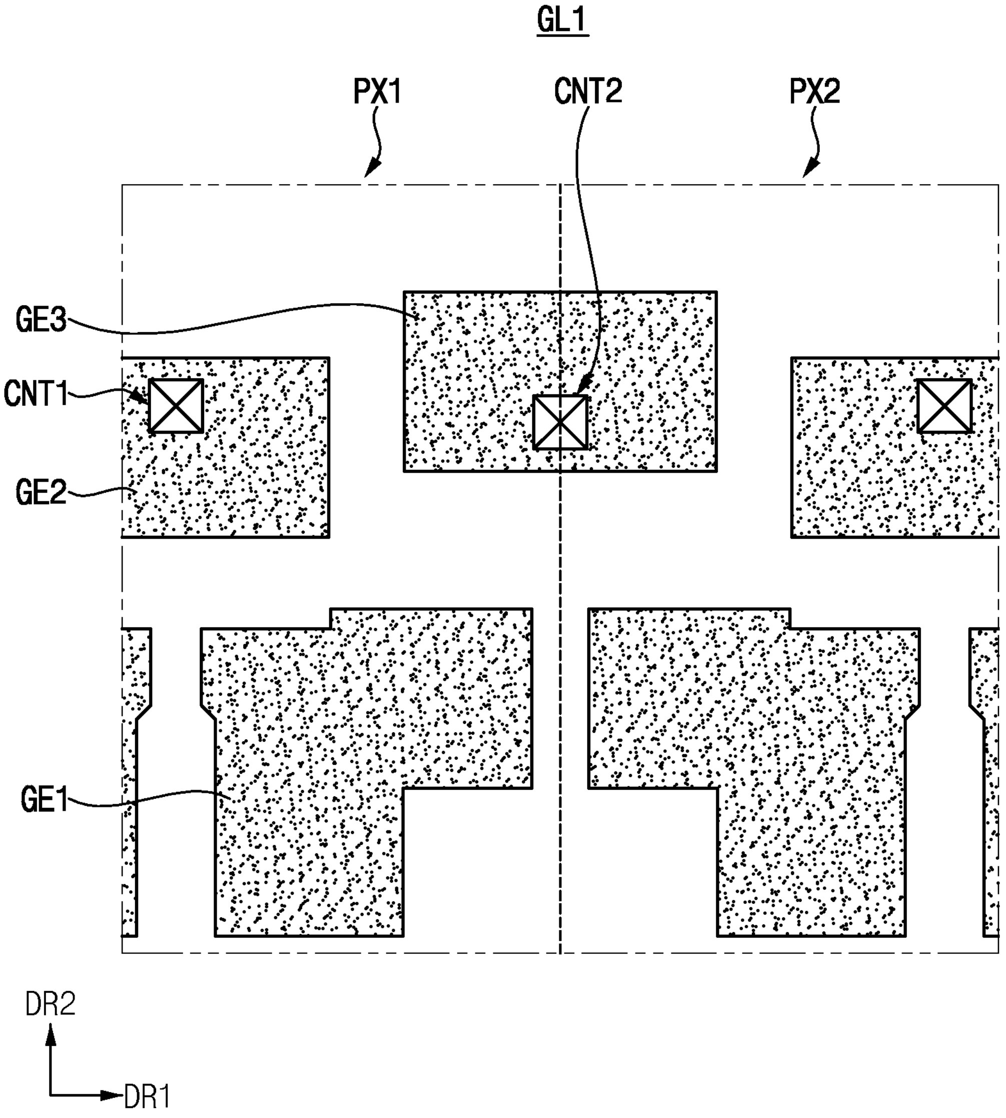
Figure 9:
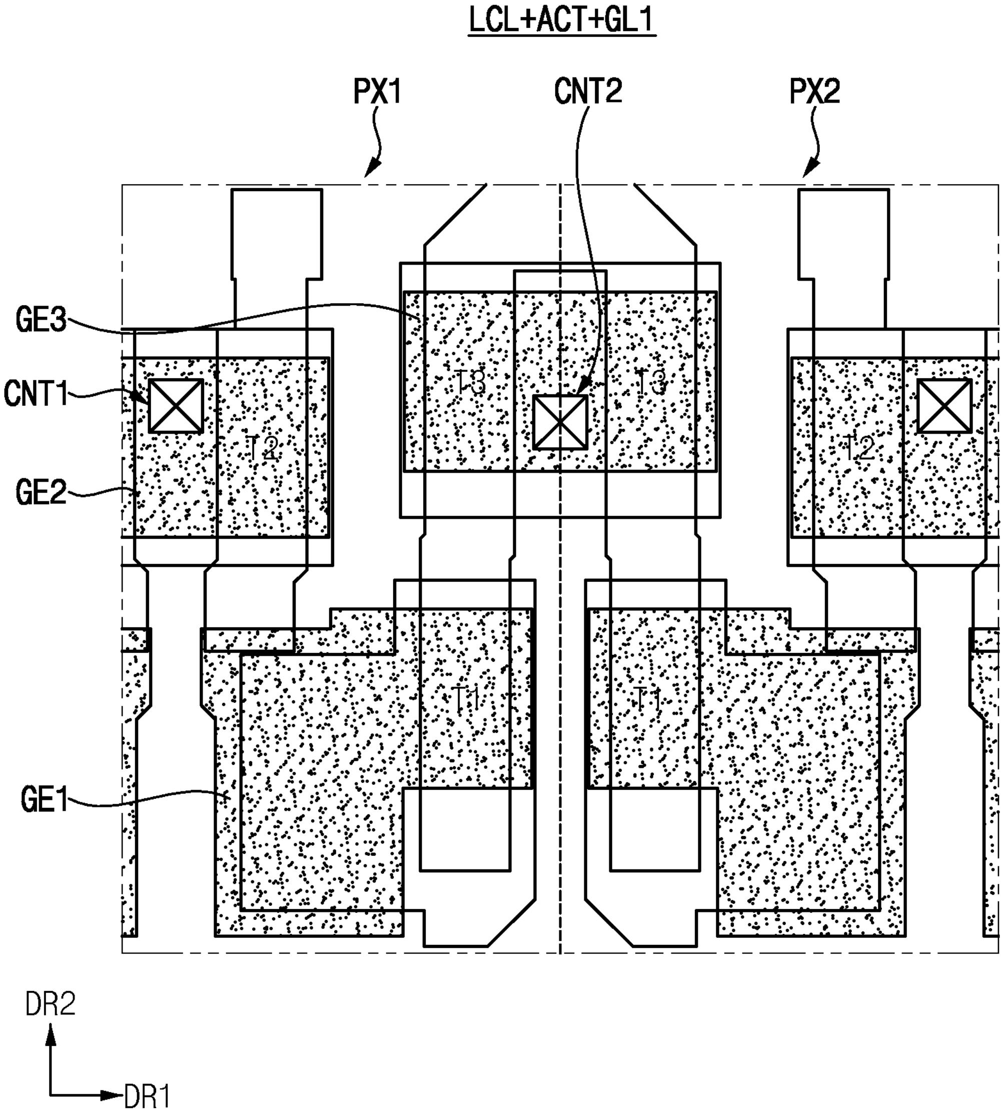

Referring further to FIGS. 8 and 9, the display portion DP may further include a first gate layer GL1 disposed on the active layer ACT. In an embodiment, a first insulating layer IL1 (shown in FIGS. 16 and 17) may be disposed on the active layer ACT, and the first gate layer GL1 may be disposed on the first insulating layer IL1. For example, the first insulating layer IL1 may include a silicon compound such as silicon oxide, silicon nitride, or the like. These can be used alone or in combination with each other (see FIGS. 16 and 17).

The first gate layer GL1 may include a first gate electrode GE1, a second gate electrode GE2, and a third gate electrode GE3. The first gate electrode GE1, the second gate electrode GE2, and the third gate electrode GE3 may be disposed to be spaced apart from each other.

The first gate electrode GE1, the second gate electrode GE2, and the third gate electrode GE3 may be disposed in a same layer as each other. In addition, the first gate electrode GE1, the second gate electrode GE2, and the third gate electrode GE3 may include a same material as each other and may be formed through a same process.

The first gate electrode GE1 may at least partially overlap each of the first conductive pattern CP1, the second conductive pattern CP2, and the first active pattern AP1 in the plan view. The first gate electrode GE1 may be disposed in the first pixel PX1 and the second pixel PX2, respectively. The first gate electrode GE1 disposed in the first pixel PX1 and the first gate electrode GE1 disposed in the second pixel PX2 may be symmetrical to each other based on the imaginary symmetry line at the boundary between the first pixel PX1 and the second pixel PX2.

In an embodiment, a part of the first active pattern AP1 and a part of the first gate electrode GE1 (i.e., a gate terminal) overlapping the part of the first active pattern AP1 may constitute the first transistor T1. The first transistor T1 of FIG. 9 may correspond to the first transistor T1 of FIG. 2.

The second gate electrode GE2 may at least partially overlap each of the first conductive pattern CP1 and the second active pattern AP2 in the plan view. The second gate electrode GE2 may be connected to the first conductive pattern CP1 through a first contact hole CNT1. The second gate electrode GE2 may be disposed in the first pixel PX1 and the second pixel PX2, respectively. The second gate electrode GE2 disposed in the first pixel PX1 and the second gate electrode GE2 disposed in the second pixel PX2 may be symmetrical to each other based on the imaginary symmetry line at the boundary between the first pixel PX1 and the second pixel PX2.

In an embodiment, a part of the second active pattern AP2 and a part of the second gate electrode GE2 (i.e., a gate terminal) overlapping the part of the second active pattern AP2 may constitute the second transistor T2. The second transistor T2 of FIG. 9 may correspond to the second transistor T2 of FIG. 2.

The third gate electrode GE3 may at least partially overlap each of the third conductive pattern CP3 and the first active pattern AP1 in the plan view. The third gate electrode GE3 may be connected to the third conductive pattern CP3 through a second contact hole CNT2. The third gate electrode GE3 may be shared by a first area where the first pixel PX1 is disposed and a second area where the second pixel PX2 is disposed. That is, the third gate electrode GE3 may include a first part disposed in the first area and a second part disposed in the second area. In other words, the first part of the third gate electrode GE3 may be symmetrical with the second part based on an imaginary symmetry line vertically passing through a center of the third gate electrode GE3.

In an embodiment, another part of the first active pattern AP1 and a part (i.e., gate terminal) of the third gate electrode GE3 overlapping another part of the first active pattern AP1 may constitute the third transistor T3. The third transistor T3 of FIG. 9 may correspond to the third transistor T3 of FIG. 2.

Accordingly, the first pixel PX1 may include the first, second, and third transistors T1, T2, and T3, and the second pixel PX2 may also include the first, second, and third transistors T1, T2, and T3.

For example, the first gate layer GL1 may include metal, alloy, metal nitride, conductive metal oxide, transparent conductive material, or the like. These can be used alone or in combination with each other.

Figure 10:
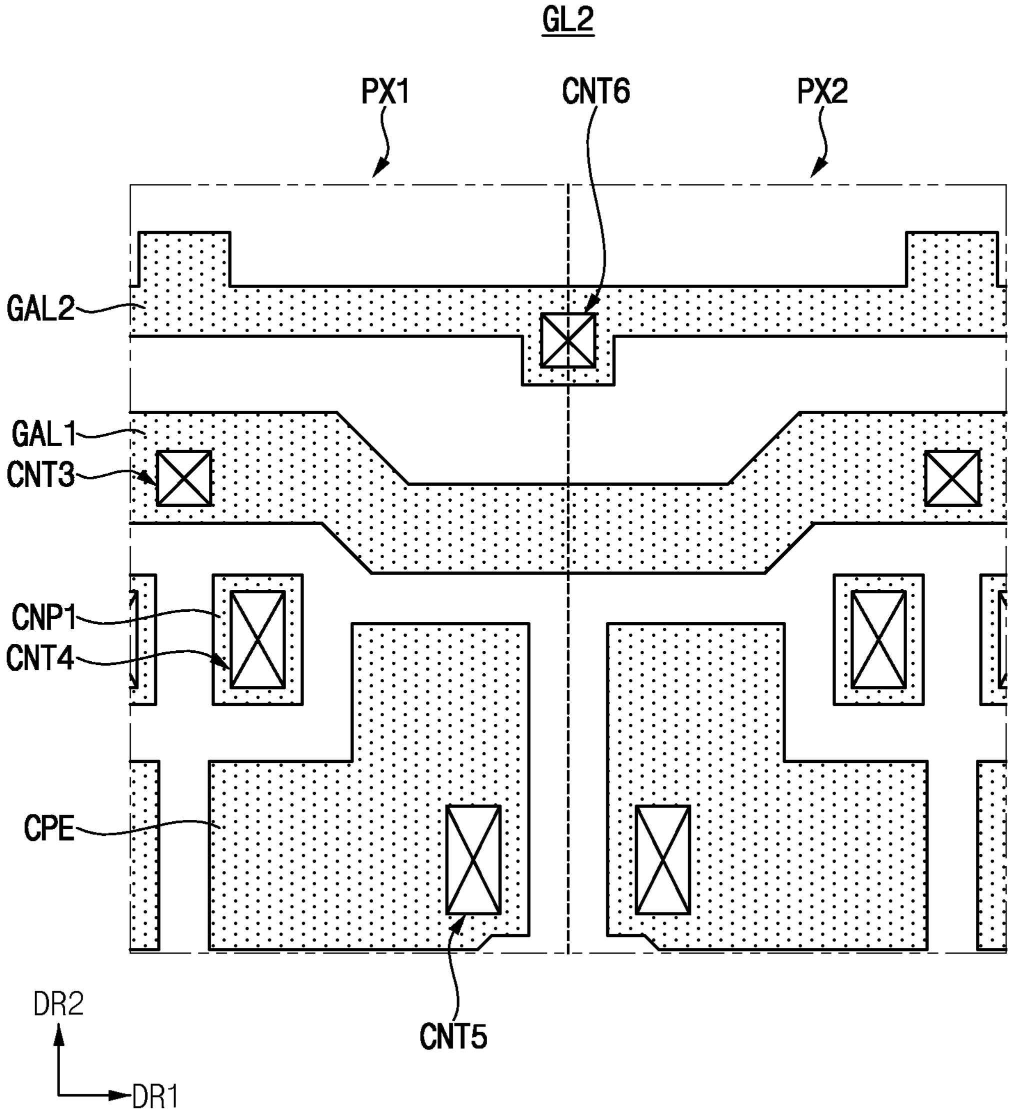
Figure 11:
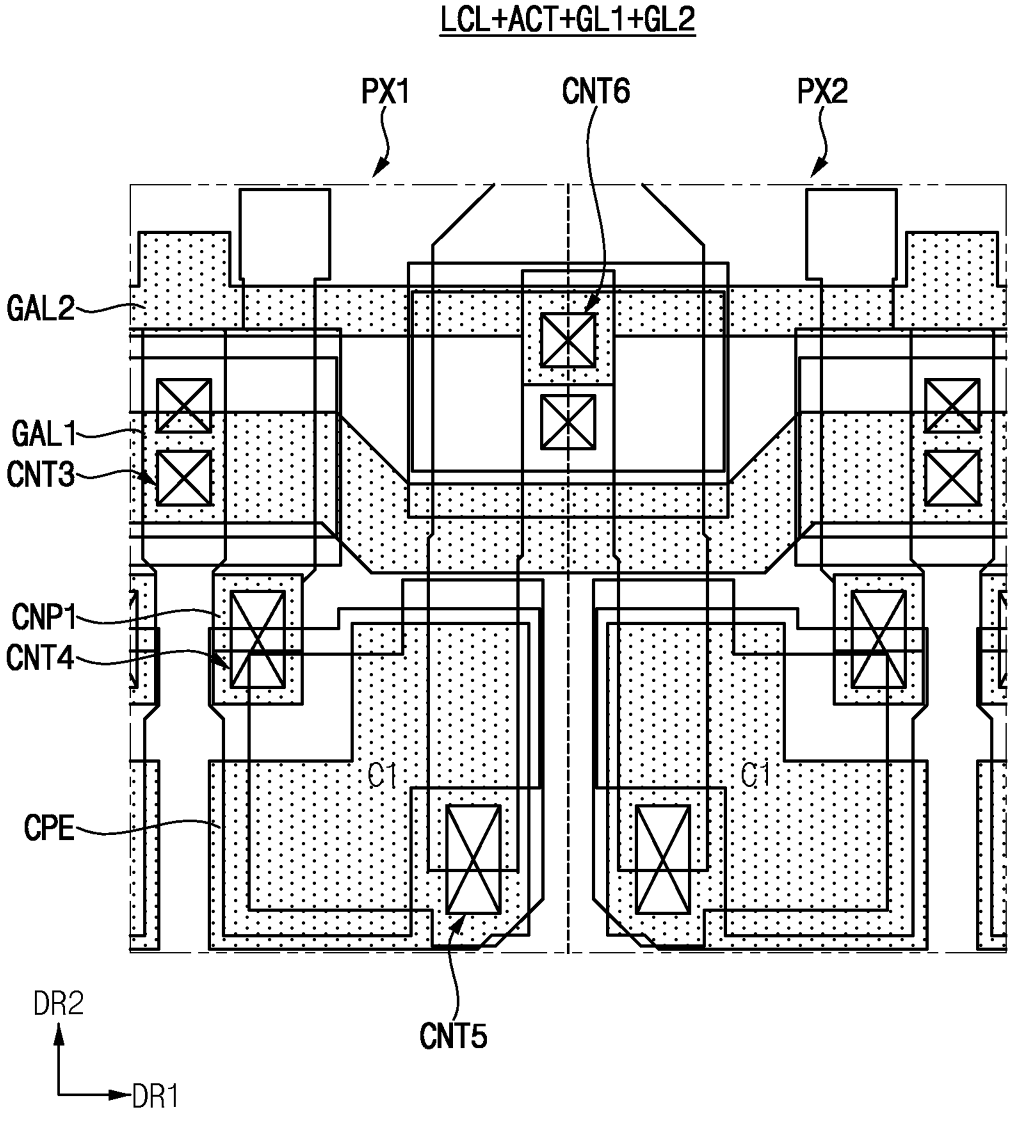

Referring further to FIGS. 10 and 11, the display portion DP may further include a second gate layer GL2 disposed on the first gate layer GL1. In an embodiment, a second insulating layer IL2 (shown in FIGS. 16 and 17) may be disposed on the first gate layer GL1, and the second gate layer GL2 may be disposed on the second insulating layer IL2. For example, the second insulating layer IL2 may include a silicon compound such as silicon oxide, silicon nitride, or the like. These can be used alone or in combination with each other (see FIGS. 16 and 17).

The second gate layer GL2 may include a first gate line GAL1, a second gate line GAL2, a first connection pattern CNP1, and a capacitor electrode CPE. The first gate line GAL1, the second gate line GAL2, the first connection pattern CNP1, and the capacitor electrode CPE may be arranged to be spaced apart from each other.

The first gate line GAL1, the second gate line GAL2, the first connection pattern CNP1, and the capacitor electrode CPE may be disposed in a same layer as each other. In addition, the first gate line GAL1, the second gate line GAL2, the first connection pattern CNP1, and the capacitor electrode CPE may include a same material as each other and may be formed through a same process.

The first gate line GAL1 may extend in the first direction DR1. The first gate line GAL1 may be connected to the second gate electrode GE2 through a third contact hole CNT3. In addition, a first gate signal (e.g., the first gate signal GW of FIG. 2) may be applied to the first gate line GAL1. In addition, the first gate signal may be transmitted to the second gate electrode GE2 and the first conductive pattern CP1 through the first gate line GAL1.

The second gate line GAL2 may extend in the first direction DR1. The second gate line GAL2 may be connected to the third gate electrode GE3 through a sixth contact hole CNT6. In addition, a second gate signal (e.g., the second gate signal GC in FIG. 2) may be applied to the second gate line GAL2. In addition, the second gate signal may be transmitted to the third gate electrode GE3 and the third conductive pattern CP3 through the second gate line GAL2.

The first connection pattern CNP1 may connect the second active pattern AP2 and the first gate electrode GE1 through a fourth contact hole CNT4. In addition, the first transistor T1 and the second transistor T2 may be electrically connected to each other. The first connection pattern CNP1 may be disposed in the first pixel PX1 and the second pixel PX2, respectively. The first connection pattern CNP1 disposed in the first pixel PX1 and the first connection pattern CNP1 disposed in the second pixel PX2 may be symmetrical to each other based on the imaginary symmetry line at the boundary between the first pixel PX1 and the second pixel PX2.

The capacitor electrode CPE may connect the first active pattern AP1 and the second conductive pattern CP2 through a fifth contact hole CNT5. In addition, the capacitor electrode CPE may at least partially overlap each of the second conductive pattern CP2, the first active pattern AP1, and the first gate electrode GE1 in the plan view. In an embodiment, the first gate electrode GE1 and a part of the capacitor electrode CPE overlapping the first gate electrode GE1 may constitute the first capacitor C1 (see FIG. 16). The first capacitor C1 of FIG. 11 may correspond to the first capacitor C1 of FIG. 2.

The capacitor electrode CPE may be disposed in the first pixel PX1 and the second pixel PX2, respectively. The capacitor electrode CPE disposed in the first pixel PX1 and the capacitor electrode CPE disposed in the second pixel PX2 may be symmetrical to each other based on the imaginary symmetry line at the boundary between the first pixel PX1 and the second pixel PX2.

Accordingly, the first pixel PX1 may include the first capacitor C1, and the second pixel PX2 may also include the first capacitor C1.

For example, the second gate layer GL2 may include metal, alloy, metal nitride, conductive metal oxide, transparent conductive material, or the like. These can be used alone or in combination with each other.

Figure 12:
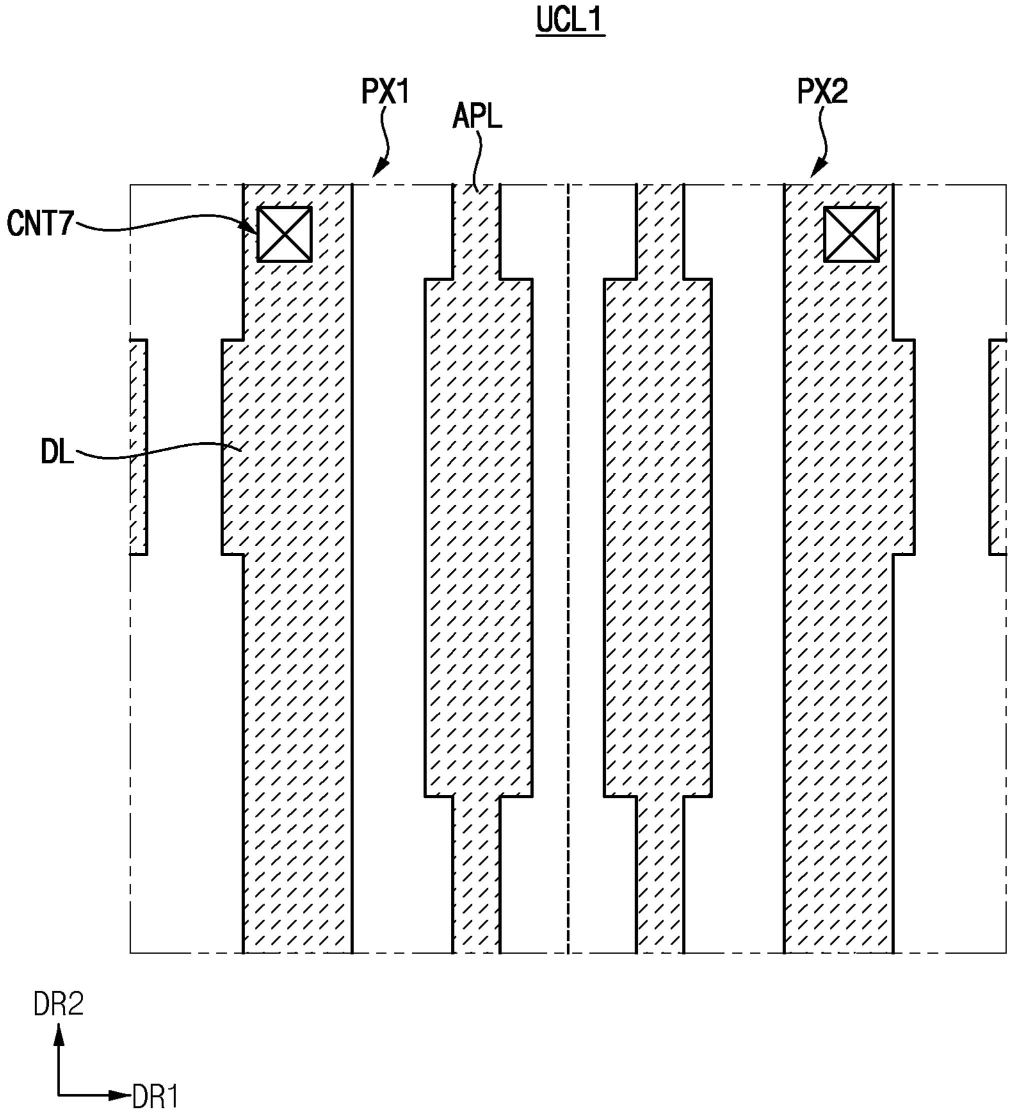
Figure 13:
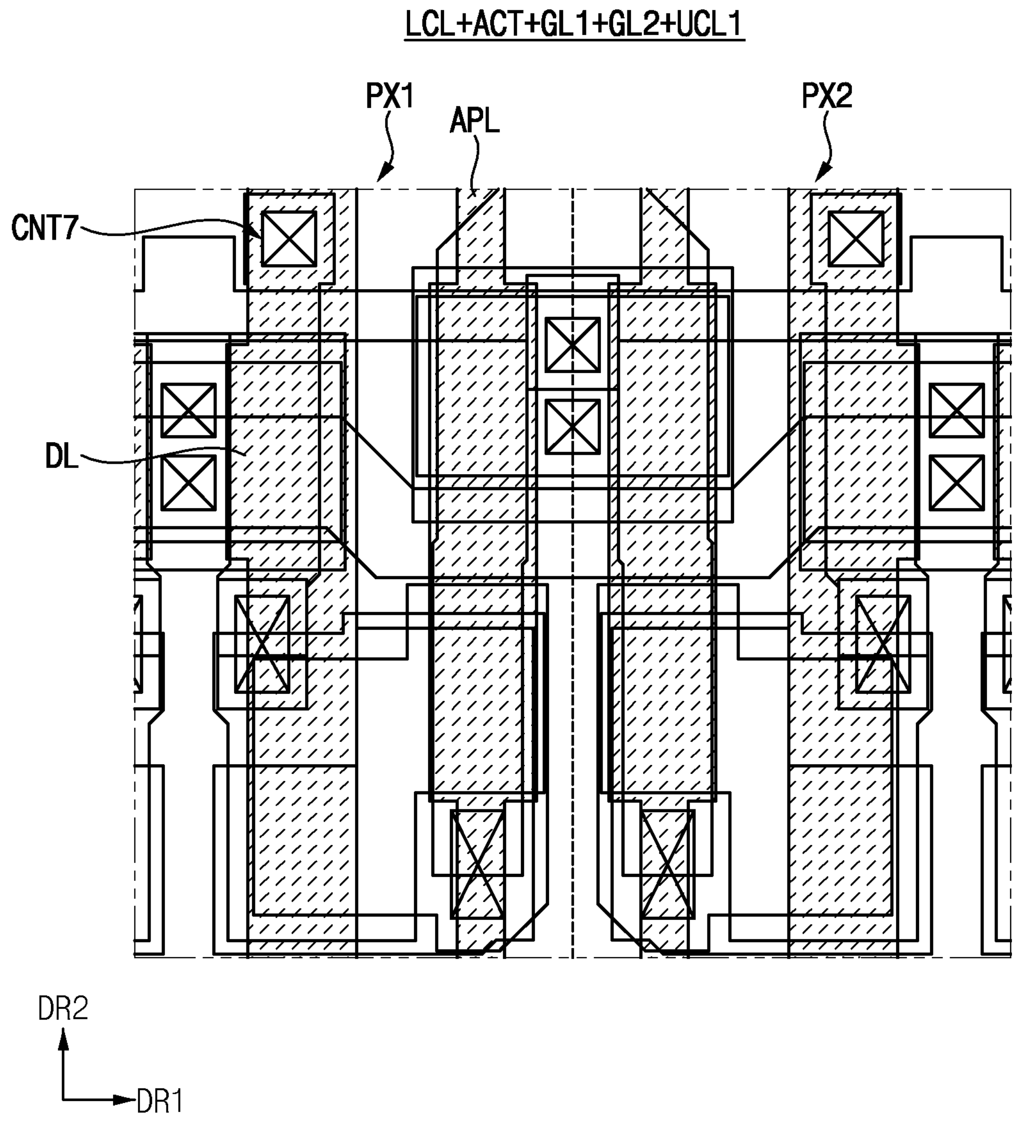

Referring further to FIGS. 12 and 13, the display portion DP may further include a first upper conductive layer UCL1 disposed on the second gate layer GL2. In an embodiment, a third insulating layer IL3 (shown in FIGS. 16 and 17) may be disposed on the second gate layer GL2, and the first upper conductive layer UCL1 may be disposed on the third insulating layer IL3. For example, the third insulating layer IL3 may include a silicon compound such as silicon oxide, silicon nitride, or the like. These can be used alone or in combination with each other (see FIGS. 16 and 17).

The first upper conductive layer UCL1 may include a data line DL and an additional power line APL. The data line DL and the additional power line APL may be disposed to be spaced apart from each other in the first direction DR1.

The data line DL and the additional power line APL may be disposed in a same layer as each other. In addition, the data line DL and the additional power line APL may include a same material as each other, and be formed through a same process.

The data line DL may extend in the second direction DR2. The data line DL may be connected to the second active pattern AP2 through a seventh contact hole CNT7. In addition, a data voltage (e.g., the data voltage DATA of FIG. 2) may be applied to the data line DL. In addition, the data voltage may be transmitted to the second active pattern AP2 through the data line DL.

The data line DL may be disposed in the first pixel PX1 and the second pixel PX2, respectively. The data line DL disposed in the first pixel PX1 and the data line DL disposed in the second pixel PX2 may be symmetrical to each other based on the imaginary symmetry line at the boundary between the first pixel PX1 and the second pixel PX2.

As described above, in an embodiment, the first upper conductive layer UCL1 may include the additional power line APL. The additional power line APL may extend in the second direction DR2.

In an embodiment, a first power voltage (e.g., the first power voltage ELVDD of FIG. 2) may be applied to the additional power line APL. In this case, a voltage drop of the first power voltage can be reduced due to the additional power line APL.

In another embodiment, a direct current power voltage (e.g., a gate high voltage or a gate low voltage) different from the first power voltage may be applied to the additional power line APL.

The additional power line APL may be disposed in the first pixel PX1 and the second pixel PX2, respectively. The additional power line APL disposed in the first pixel PX1 and the additional power line APL disposed in the second pixel PX2 may be symmetrical to each other based on the imaginary symmetry line at the boundary between the first pixel PX1 and the second pixel PX2.

For example, the first upper conductive layer UCL1 may include metal, alloy, metal nitride, conductive metal oxide, transparent conductive material, or the like. These can be used alone or in combination with each other.

Figure 14:
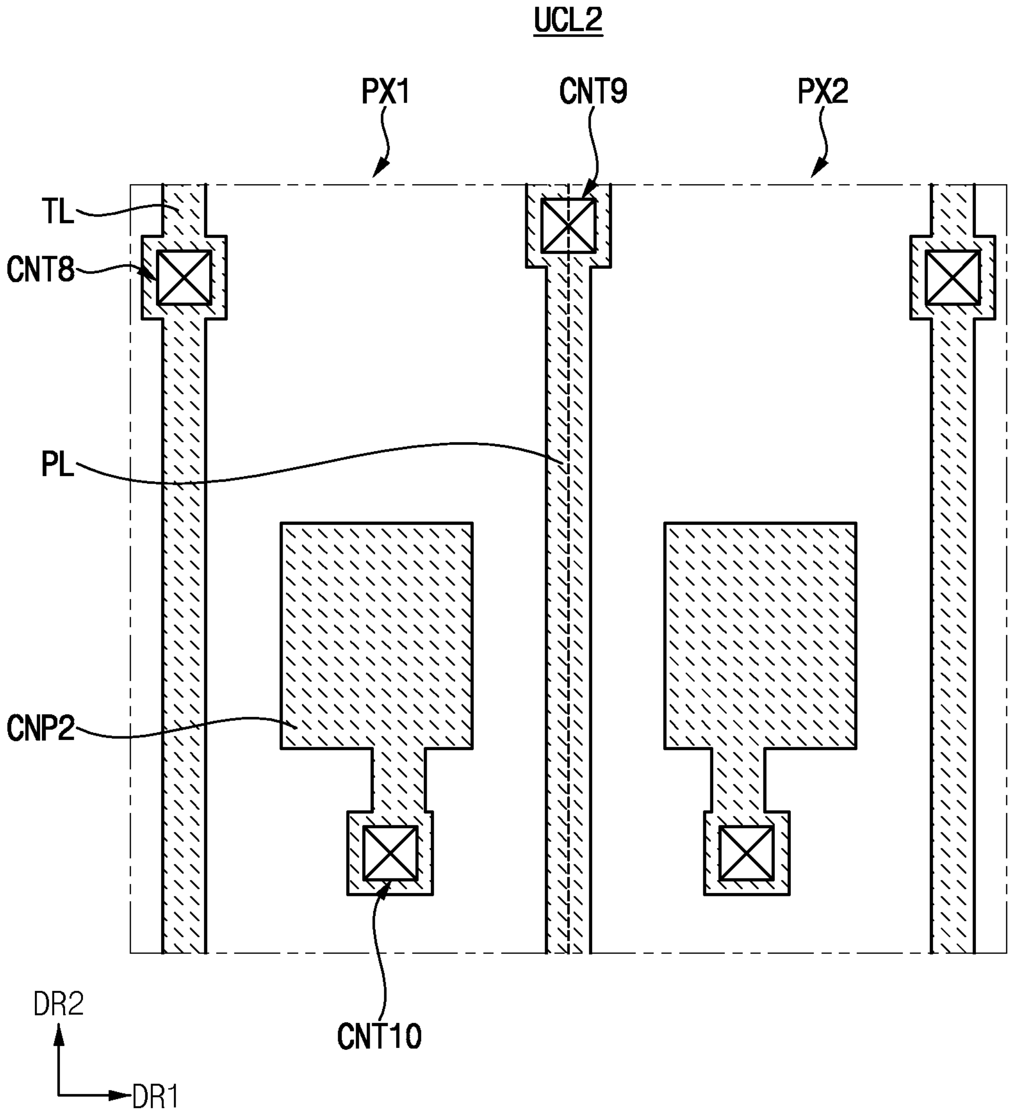
Figure 15:
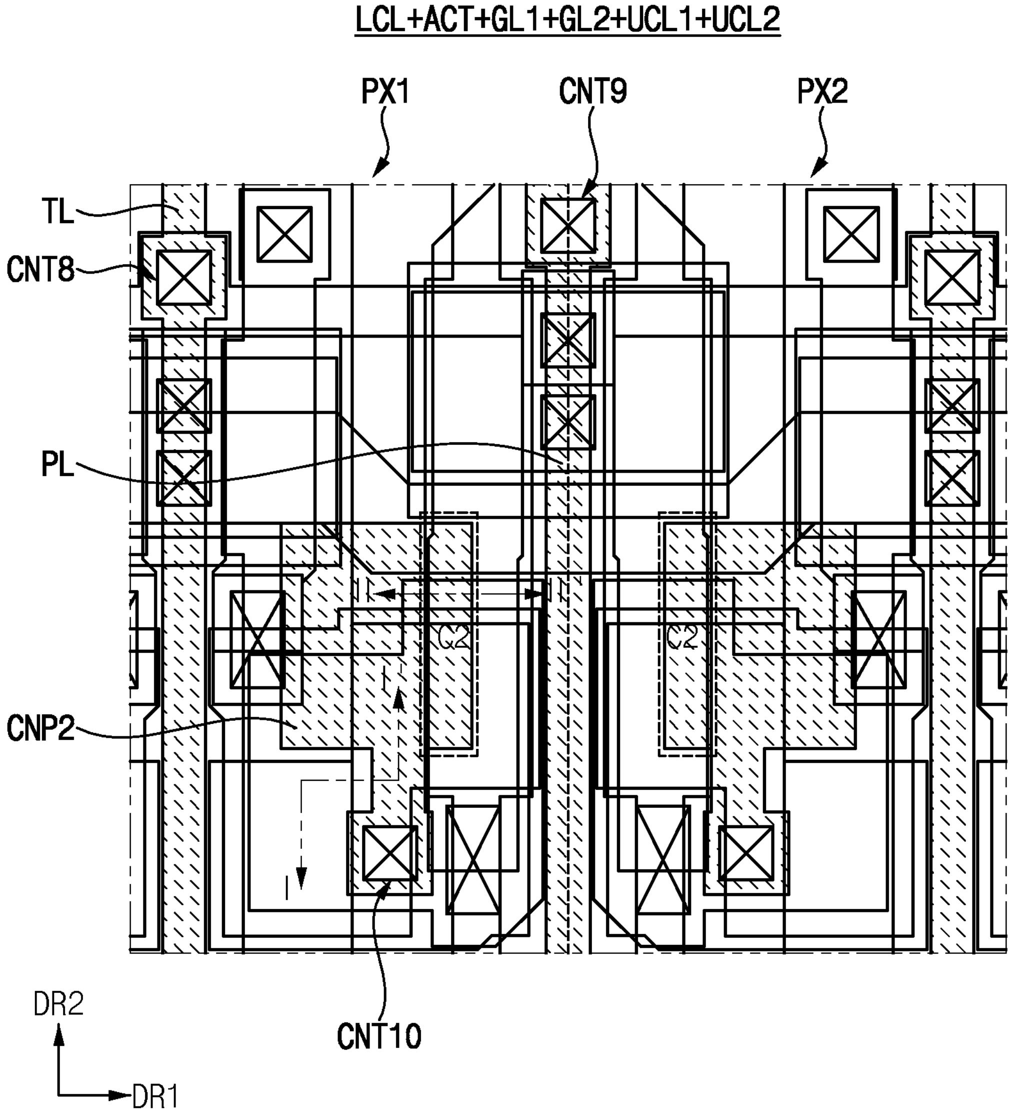

Referring to FIGS. 14 and 15, the display portion DP may further include a second upper conductive layer UCL2 disposed on the first upper conductive layer UCL1. In an embodiment, a fourth insulating layer IL4 (shown in FIGS. 16 and 17) may be disposed on the first upper conductive layer UCL1, and the second upper conductive layer UCL2 may be disposed on the fourth insulating layer IL4. For example, the fourth insulating layer IL4 may include an organic material such as phenolic resin, polyacrylates resin, polyimides rein, polyamides resin, siloxane resin, epoxy resin, or the like. These can be used alone or in combination with each other.

The second upper conductive layer UCL2 may include a transmission line TL, a second connection pattern CNP2, and a power line PL. The transmission line TL, the second connection pattern CNP2, and the power line PL may be disposed to be spaced apart from each other.

The transmission line TL, the second connection pattern CNP2, and the power line PL may be disposed in a same layer as each other. In addition, the transmission line TL, the second connection pattern CNP2, and the power line PL may include a same material as each other and be formed through a same process.

The transmission line TL may extend in the second direction DR2. The transmission line TL may be connected to the second gate line GAL2 through an eighth contact hole CNT8. In addition, the second gate signal may be applied to the transmission line TL. In addition, the transmission line TL may transmit the second gate signal applied to the second gate line GAL2 to adjacent pixels in the second direction DR2.

In an embodiment, the transmission line TL may be shared by areas where two adjacent pixels are disposed. For example, the transmission line TL may be shared by areas where the first pixel PX1 and a pixel adjacent to the first pixel PX1 in a direction opposite to the first direction DR1 are disposed, and may be shared by areas where the second pixel PX2 and a pixel adjacent to the second pixel PX2 in the first direction DR1 are disposed.

The power line PL may extend in the second direction DR2. The power line PL may be connected to the first active pattern AP1 through a ninth contact hole CNT9. In addition, the first power voltage may be applied to the power line PL. In addition, the first power voltage may be transmitted to the first active pattern AP1 through the power line PL.

The power line PL may be shared by areas where two adjacent pixels are disposed. For example, the power line PL may be shared by areas where the first pixel PX1 and the second pixel PX2 are disposed adjacent to each other in the first direction DR1. For example, the power line PL may extend along the imaginary symmetry line at the boundary between the first pixel PX1 and the second pixel PX2.

The second connection pattern CNP2 may be connected to the capacitor electrode CPE through a tenth contact hole CNT10. In addition, the second connection pattern CNP2 may be connected to a pixel electrode (e.g., the pixel electrode PE of FIG. 4) through a contact hole. In addition, a light emitting element (e.g., the light emitting element LED of FIGS. 2 and 4) and a pixel circuit (e.g., the pixel circuit PC of FIG. 2) may be electrically connected to each other through the second connection pattern CNP2.

The second connection pattern CNP2 may at least partially overlap each of the data line DL and the additional power line APL in the plan view. In an embodiment, a part of the second connection pattern CNP2 and a part of the additional power line APL overlapping the part of the second connection pattern CNP2 may constitute the second capacitor C2. The second capacitor C2 of FIG. 15 may correspond to the second capacitor C2 of FIG. 2 (see FIG. 17).

The second connection pattern CNP2 may be disposed in the first pixel PX1 and the second pixel PX2, respectively. The second connection pattern CNP2 disposed in the first pixel PX1 and the second connection pattern CNP2 disposed in the second pixel PX2 may be symmetrical to each other based on the imaginary symmetry line at the boundary between the first pixel PX1 and the second pixel PX2.

For example, the second upper conductive layer UCL2 may include metal, alloy, metal nitride, conductive metal oxide, transparent conductive material, or the like. These can be used alone or in combination with each other.

Accordingly, the first pixel PX1 may include the second capacitor C2, and the second pixel PX2 may also include the second capacitor C2.

A fifth insulating layer IL5 (shown in FIGS. 16 and 17) may be disposed on the second upper conductive layer UCL2. For example, the fifth insulating layer may include an organic material such as phenol resin, acrylic resin, polyimide resin, polyamide resin, siloxane resin, epoxy resin, or the like. These can be used alone or in combination with each other.

Figure 18:
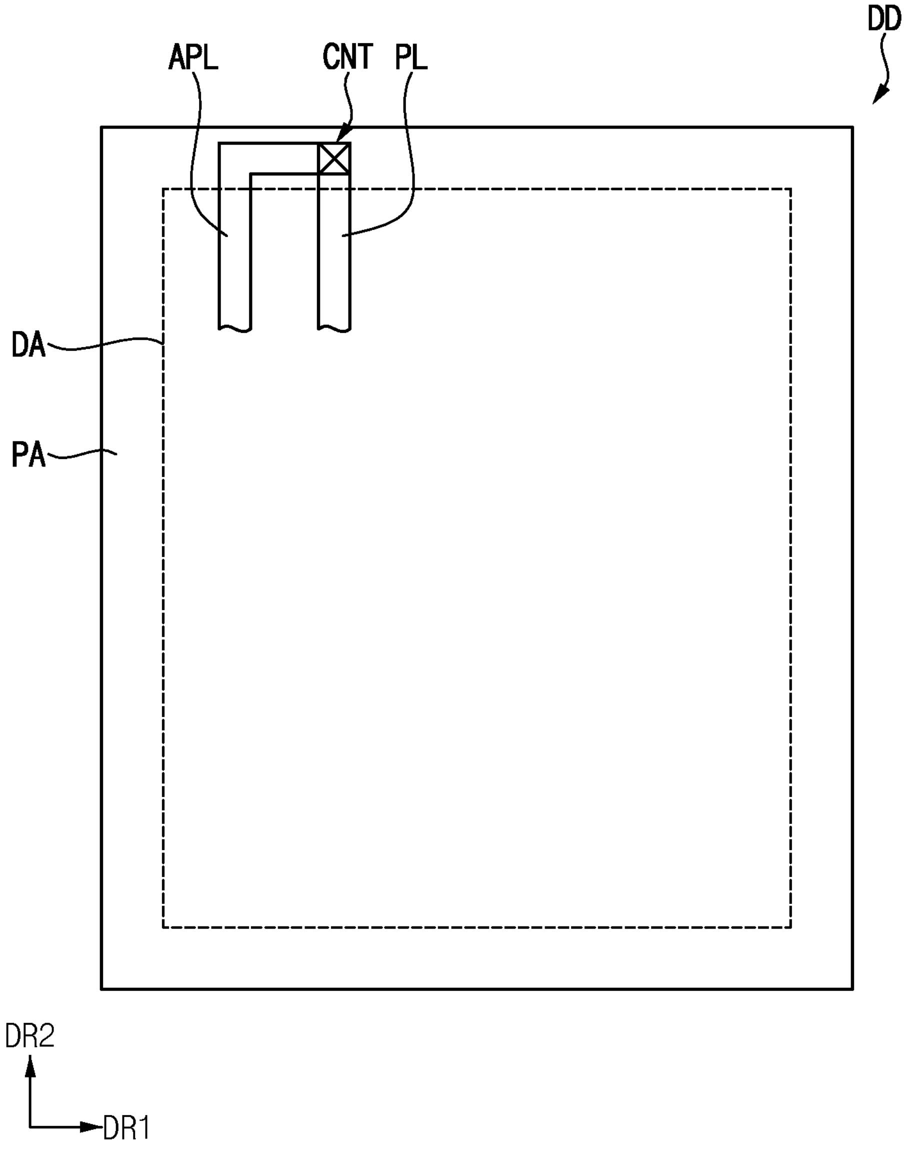
FIG. 18 is a plan view illustrating an example in which a power line and an additional power line of FIG. 15 are connected.

FIG. 18 is a plan view illustrating an example in which a power line and an additional power line of FIG. 15 are connected.

Referring to FIGS. 12, 13, 14, 15 and 18, an embodiment of the display device DD may include a display area DA and a peripheral area PA. As the display device DD includes the display area DA and the peripheral area PA, the substrate SUB of FIGS. 4, 16, and 17 may also include the display area DA and the peripheral area PA In an embodiment, a first power voltage (e.g., the first power voltage ELVDD of FIG. 2) may be applied to the additional power line APL. In an embodiment, the additional power line APL may be connected to the power line PL through a contact hole in the peripheral area PA. However, embodiments of the disclosure are not limited thereto.

Figure 19:
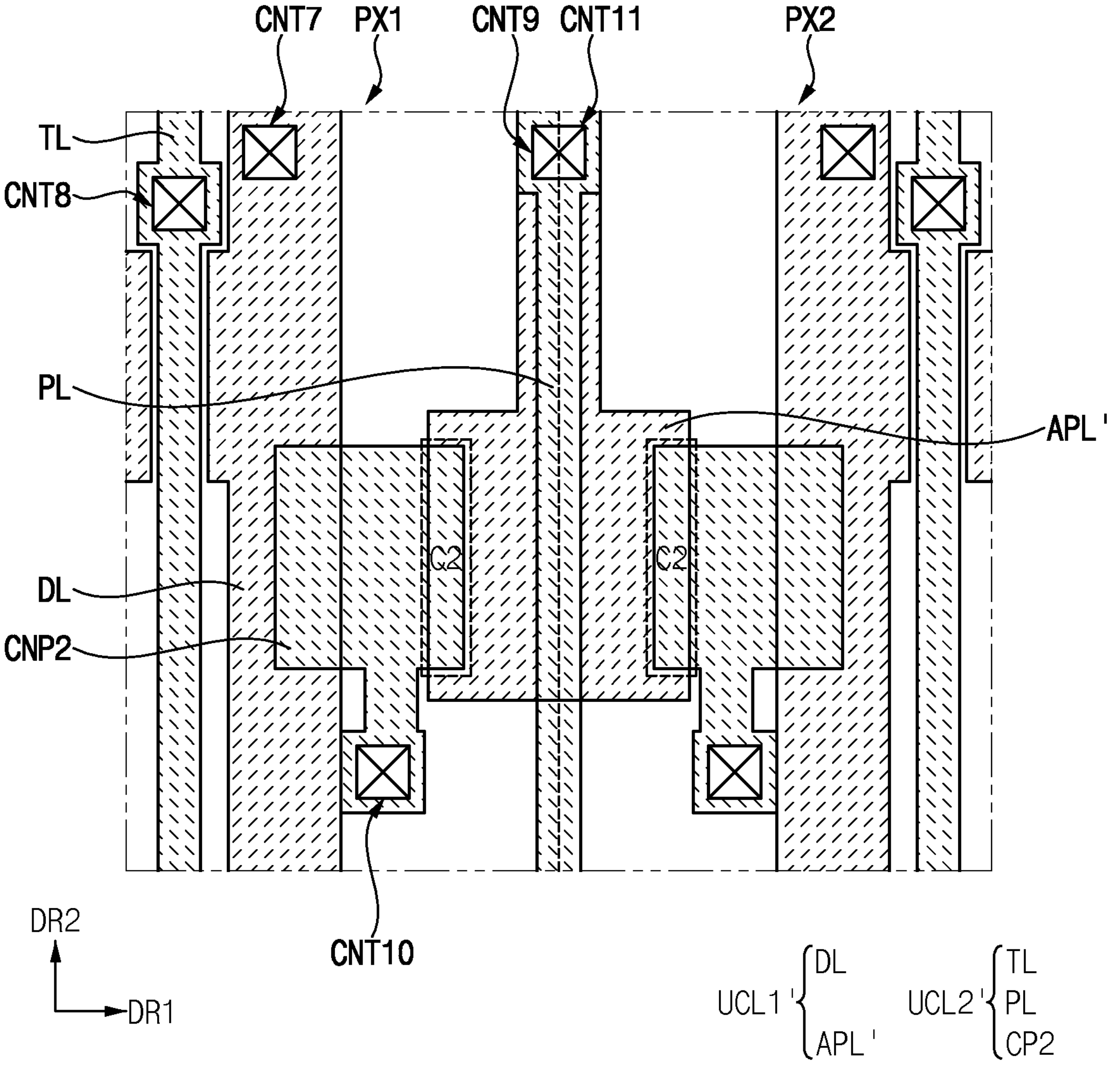
FIG. 19 is a plan view illustrating another example in which a power line and an additional power line of FIG. 15 are connected.

FIG. 19 is a plan view illustrating another example in which a power line and an additional power line of FIG. 15 are connected.

The embodiment of the display device shown in FIG. 19 may be substantially the same as or similar to the embodiments of the display device DD described above with reference to FIGS. 5 to 17 except for the connection position of an additional power line APL' and the power line PL. Hereinafter, any repetitive detailed descriptions of the same or like elements as those described above will be omitted or simplified.

In an embodiment, a first upper conductive layer UCL1' may include a data line DL and the additional power line APL', and a second upper conductive layer UCL2' may include a transmission line TL, a power line PL, and a second connection pattern CNP2.

In an embodiment, the additional power line APL' may at least partially overlap each of the power line PL and the second connection pattern CNP2 in the plan view. The additional power line APL' may be shared by a first area where the first pixel PX1 is disposed and a second area where the second pixel PX2 is disposed. That is, the additional power line APL' may include a first part disposed in the first area and a second part disposed in the second area. In other words, the first part of the additional power line APL' may be symmetrical with the second part based on an imaginary symmetrical line vertically passing through a center of the additional power line APL' or the imaginary symmetry line at the boundary between the first pixel PX1 and the second pixel PX2.

In an embodiment, a part of the second connection pattern CNP2 and a part of the additional power line APL' overlapping the part of the second connection pattern CNP2 may constitute the second capacitor C2. The second capacitor C2 of FIG. 19 may correspond to the second capacitor C2 of FIG. 2.

In such an embodiment, a first power voltage (e.g., the first power voltage ELVDD of FIG. 2) may be applied to the additional power line APL'. In such an embodiment, the additional power line APL' may be connected to the power line PL in a display area (e.g., the display area DA of FIG. 18) corresponding to a display portion (e.g., the display portion DP of FIG. 1). In an embodiment, the additional power line APL' may be connected to the power line PL through a eleventh contact hole CNT11.

As described above with reference to FIGS. 1 to 19, in the display device DD according to embodiments of the disclosure, the pixel PX may include the pixel circuit PC including three transistors and two capacitors, and the light emitting element LED electrically connected to the pixel circuit PC. The first capacitor C1 among the capacitors may be connected between the gate terminal of the first transistor T1 and the first terminal of the first transistor T1, and the second capacitor C2 among the capacitors may be connected between the first terminal of the first transistor T1 and the first power voltage ELVDD. The plurality of pixels PX may emit light simultaneously during a light emitting period.

In such embodiments, the first power voltage ELVDD may have a low level in the initialization period P1 and may have a high level after the initialization period P1, and the second power voltage ELVSS may have a low level in the light emitting period P4 and may have a high level in remaining periods excluding the light emitting period P4.

In such embodiments, a part of the second connection pattern CNP2 connected to the pixel electrode PE and a part of the additional power line APL and APL' overlapping the part of the second connection pattern CNP2 may constitute the second capacitor C2. The first power voltage ELVDD or a direct current power voltage may be applied to the additional power line APL and APL'.

Accordingly, the data swing range can be relatively reduced. In such embodiments, the pixels PX can be applied to small and medium-sized high-resolution display devices.

Embodiments of The disclosure can be applied to various display devices, such as display devices for vehicles, ships and aircraft, portable communication devices, display devices for exhibition or information transmission, medical display devices, or the like, for example.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel which sequentially performs an initialization operation, a threshold voltage compensation operation, a data writing operation, and a light emitting operation during one frame, the pixel comprising:

a first transistor including a gate terminal connected to a first node, a first terminal, and a second terminal connected to a second node;

a second transistor including a gate terminal, to which a first gate signal is applied, a first terminal, to which a data voltage is applied, and a second terminal connected to the first node;

a third transistor including a gate terminal, to which a second gate signal is applied, a first terminal, to which a first power voltage is applied, and a second terminal connected to the first terminal of the first transistor;

a first capacitor including a first terminal connected to the first node and a second terminal connected to the second node;

a second capacitor including a first terminal, to which the first power voltage is applied, and a second terminal connected to the second node; and a light emitting element including a first terminal connected to the second node and a second terminal, to which a second power voltage is applied, wherein the first power voltage has a low level during an initialization period, in which the initialization operation is performed, and the first power voltage has a high level in remaining period, in which the threshold voltage compensation operation, the data writing operation, and the light emitting operation are performed in the one frame, excluding the initialization period.

2. The pixel of claim 1, wherein the second power voltage has a low level in a light emitting period, in which the light emitting operation is performed, and the second power voltage has a high level in remaining periods, in which the initialization operation, the threshold voltage compensation operation, and the data writing operation are performed in the one frame, excluding the light emitting period.

3. The pixel of claim 1, wherein each of the first, second, and third transistors is an n-channel metal-oxide semiconductor transistor.

4. The pixel of claim 1, wherein the first gate signal is a global clock signal for simultaneous light emitting.

5. The pixel of claim 1, wherein the second gate signal has a high level in an initialization period, in which the initialization operation is performed, and a light emitting period, in which the light emitting operation is performed, and the second gate signal has a low level in a threshold voltage compensation period, in which the threshold voltage compensation operation is performed, and a data writing period, in which the data writing operation is performed.

6. A display device comprising:

a display portion including a plurality of pixels, wherein each of the pixels sequentially performs an initialization operation, a threshold voltage compensation operation, a data writing operation, and a light emitting operation during one frame; and a driving circuit which drives the display portion by providing a data voltage, a first gate signal, a second gate signal, a first power voltage, and a second power voltage to the pixels, wherein each of the pixels includes:

a first transistor including a gate terminal connected to a first node, a first terminal, and a second terminal connected to a second node;

a second transistor including a gate terminal, to which a first gate signal is applied, a first terminal, to which a data voltage is applied, and a second terminal connected to the first node;

a third transistor including a gate terminal, to which a second gate signal is applied, a first terminal, to which a first power voltage is applied, and a second terminal connected to the first terminal of the first transistor;

a first capacitor including a first terminal connected to the first node and a second terminal connected to the second node;

a second capacitor including a first terminal, to which the first power voltage is applied, and a second terminal connected to the second node; and a light emitting element including a first terminal connected to the second node and a second terminal, to which a second power voltage is applied, wherein the first power voltage has a low level during an initialization period, in which the initialization operation is performed, and the first power voltage has a high level in remaining period, in which the threshold voltage compensation operation, the data writing operation, and the light emitting operation are performed in the one frame, excluding the initialization period.

7. The display device of claim 6, wherein the second power voltage has a low level in a light emitting period, in which the light emitting operation is performed, and the second power voltage has a high level in remaining periods, in which the initialization operation, the threshold voltage compensation operation, and the data writing operation are performed in the one frame, excluding the light emitting period.

8. The display device of claim 6, wherein the pixels simultaneously emit light during a light emitting period in which the light emitting operation is performed.

9. The display device of claim 6, wherein the second gate signal has a high level in an initialization period, in which the initialization operation is performed, and a light emitting period, in which the light emitting operation is performed, and the second gate signal has a low level in a threshold voltage compensation period, in which the threshold voltage compensation operation is performed, and a data writing period, in which the data writing operation is performed.

10. A display device comprising:

a display portion which displays an image; and a driving circuit which drives the display portion by providing a driving signal to the display portion, wherein the display portion includes:

an active layer disposed on a substrate;

a first gate layer disposed on the active layer and including a first gate electrode;

a second gate layer disposed on the first gate layer and including a capacitor electrode, wherein the capacitor electrode overlaps the first gate electrode in a plan view and constitutes a first capacitor together with a part of the first gate electrode overlapping the capacitor electrode;

a first upper conductive layer disposed on the second gate layer and including an additional power line, to which a first power voltage is applied;

a second upper conductive layer disposed on the first upper conductive layer and including a power line, to which a second power voltage is applied, and a connection pattern connected to the capacitor electrode through a contact hole, wherein the connection pattern partially overlaps the additional power line in the plan view and constitutes a second capacitor together with a part of the additional power line overlapping the connection pattern; and a pixel electrode disposed on the second upper conductive layer and connected to the connection pattern through a contact hole.

11. The display device of claim 10, wherein the substrate includes a display area corresponding to the display portion, and a peripheral area located around the display area, wherein the driving circuit is disposed in the peripheral area, and the additional power line is connected to a portion of the power line in the peripheral area through a contact hole.

12. The display device of claim 11, wherein the first power voltage and the second power voltage are a same voltage as each other.

13. The display device of claim 10, wherein the first power voltage is different form the second power voltage, and the first power voltage is a direct current power voltage.

14. The display device of claim 10, wherein the substrate includes a display area corresponding to the display portion, and a peripheral area located around the display area, wherein the driving circuit is disposed in the peripheral area, and the additional power line is connected to a portion of the power line in the display area through a contact hole.

15. The display device of claim 14, wherein the power line at least partially overlaps the additional power line in the plan view.

16. The display device of claim 10, wherein the active layer includes a first active pattern and a second active pattern spaced apart from each other, the first gate layer further includes a second gate electrode overlapping the second active pattern in the plan view and a third gate electrode overlapping the first active pattern in the plan view, the first active pattern constitutes a first transistor together with a part of the first gate electrode overlapping the first active pattern, the second active pattern constitutes a second transistor together with a part of the second gate electrode overlapping the second active pattern, and the first active pattern constitutes a third transistor together with a part of the third gate electrode overlapping the first active pattern.

17. The display device of claim 10, wherein the second upper conductive layer further includes:

a data line at least partially overlapping the connection pattern in the plan view, wherein a data voltage is applied to the data line.

18. The display device of claim 17, wherein each of the power line, the additional power line, and the data line extends in a first direction, and the power line, the additional power line, and the data line are spaced apart from each other in a second direction crossing the first direction in the plan view.

* * * * *